(12) United States Patent
Wang et al.

(10) Patent No.: US 11,812,417 B2
(45) Date of Patent: Nov. 7, 2023

(54) METHOD AND NODE INDICATING A FIRST CARRIER IN NB-IOT OPERATING WITHIN NR

(71) Applicant: Telefonaktiebolaget LM Ericsson (publ), Stockholm (SE)

(72) Inventors: Yi-Pin Eric Wang, Fremont, CA (US); Yutao Sui, Solna (SE); Olof Liberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 382 days.

(21) Appl. No.: 16/967,518

(22) PCT Filed: Feb. 1, 2019

(86) PCT No.: PCT/SE2019/050089
§ 371 (c)(1),
(2) Date: Aug. 5, 2020

(87) PCT Pub. No.: WO2019/156613
PCT Pub. Date: Aug. 15, 2019

(65) Prior Publication Data
US 2021/0227543 A1  Jul. 22, 2021

Related U.S. Application Data

(60) Provisional application No. 62/627,386, filed on Feb. 7, 2018.

(51) Int. Cl.
*H04W 72/0453* (2023.01)
*H04W 72/23* (2023.01)
(Continued)

(52) U.S. Cl.
CPC ....... *H04W 72/0453* (2013.01); *H04W 72/23* (2023.01); *H04W 4/70* (2018.02); *H04W 72/51* (2023.01)

(58) Field of Classification Search
CPC . H04W 72/0453; H04W 72/042; H04W 4/70; H04W 72/048; H04W 72/23; H04W 72/51
See application file for complete search history.

(56) References Cited

FOREIGN PATENT DOCUMENTS

| WO | 2017054771 A1 | 4/2017 |
|----|---------------|--------|
| WO | 2017197102 A2 | 11/2017 |

(Continued)

OTHER PUBLICATIONS

English Translation of WO 2019095338 A1, 2019, Retrieved from PE2E Search on Nov. 8, 2022. (Year: 2019).*

(Continued)

*Primary Examiner* — Omar J Ghowrwal
(74) *Attorney, Agent, or Firm* — SAGE PATENT GROUP

(57) ABSTRACT

A method performed by a first network node operating in a wireless communications network is described herein. The first network node initiates sending a first indication to a first wireless device operating in the wireless communications network using NB-IoT. The first indication indicates that a first carrier, the first carrier being a standalone Narrow Band-Internet of Things, NB-IoT, carrier operating within a New Radio, NR, carrier, is: a) deployed in one of: a guardband mode and an inband mode, and b) shifted away by a frequency offset from a frequency channel raster grid used by the first wireless device.

10 Claims, 17 Drawing Sheets

(51) Int. Cl.
*H04W 4/70* (2018.01)
*H04W 72/51* (2023.01)

(56) References Cited

FOREIGN PATENT DOCUMENTS

| WO | 2017222446 A1 | 12/2017 | |
|---|---|---|---|
| WO | WO-2019095338 A1 * | 5/2019 | ............... H04L 1/08 |

OTHER PUBLICATIONS

PCT International Search Report and Written Opinion dated May 27, 2019 for International Application PCT/SE2019/050089, 18 pages.
3GPP TSG-RAN4 Meeting #77 NB-IOT AH, R4-77AH-IoT-0118, "Reply LS on Power Boosting In-Band and Guard-Band Operation for NB-IoT", Budapest, Hungary, Jan. 20-22, 2016, 1 page.
Ericsson, 3GPP TSG-RAN1 NB-IOT Ad Hoc, R1-160082, "NB-Iot Channel Raster", Jan. 18-26, 2016, Budapest, Hungary, 3 pages.
Huawei et al., 3GPP TSG RAN WG1 NB-IoT Ad-Hoc Meeting, R1-160022,, "Channel Raster Design", Budapest, Hungary, Jan. 18-20, 2016, 5 pages.
Ericsson, 3GPP TSG-RAN WG1 NB-IOT AdHoc 2, R1-161830, "NB-IoT⇒Synchronization Channel Evaluations", Sophia Antipolis, France, Mar. 22-24, 2016, 10 pages.
Huawei et al., 3GPP TSG RAN WG1 NB-IoT Ad-Hoc Meeting #2, R1-161958, "NB-PSS Evaluation", Sophia-Antipolis, France, Mar. 22-24, 2016, 14 pages.
Huawei et al., 3GPP TSG RAN Meeting #70, RP-152284, "New Work Item: Narrowband IoT (NB-IoT)", Sitges, Spain, Dec. 7-10, 2015, revision of RP-152232, 11 pages.
Ericsson, 3GPP TSG-RAN WG1 NR Ad Hoc #3, R1-1716532, "NR and LTE Coexistence", Nagoya, Japan, Sep. 18-21, 2017, 6 pages.
WI rapporteur (Ericsson), 3GPP TSG-RAN WG1 Meeting #84, R1-161548, "Agreements for Rel-13 NB-IoT", St. Julian's, Malta, Feb. 15-19, 2016, 11 pages.
Ericsson, 3GPP TSG-RAN WG1 90bis , R1-1718522, "On Matching Transmissions to Available Resources", Prague, Czech Republic, Oct. 9-13, 2017, 3 pages.
Qualcomm Incorporated, 3GPP TSG RAN WG1 #91, R1-1720431, "Coexistence with NR", Reno, USA, Nov. 27-Dec. 1, 2017, 3 pages.
Huawei et al., 3GPP TSG RAN WG1 Meeting 91, R1-1719382, "Remaining Issues on Reserved Resources and Rate Matching", Reno, USA, Nov. 27-Dec. 1, 2017, 7 pages.
AT&T, 3GPP TSG RAN WG1 Meeting AH 1801, R1-1800578, "Rate Matching Aspects for NR Standalone Operation", Vancouver, Canada, Jan. 22-26, 2018, 6 pages.
First Chinese Office Action for Chinese Patent Application No. CN 201980012390.5 dated Jan. 4, 2023, 14 pages (including English translation).

* cited by examiner a)

b)

a)

b)

a)

b)

a)

b)

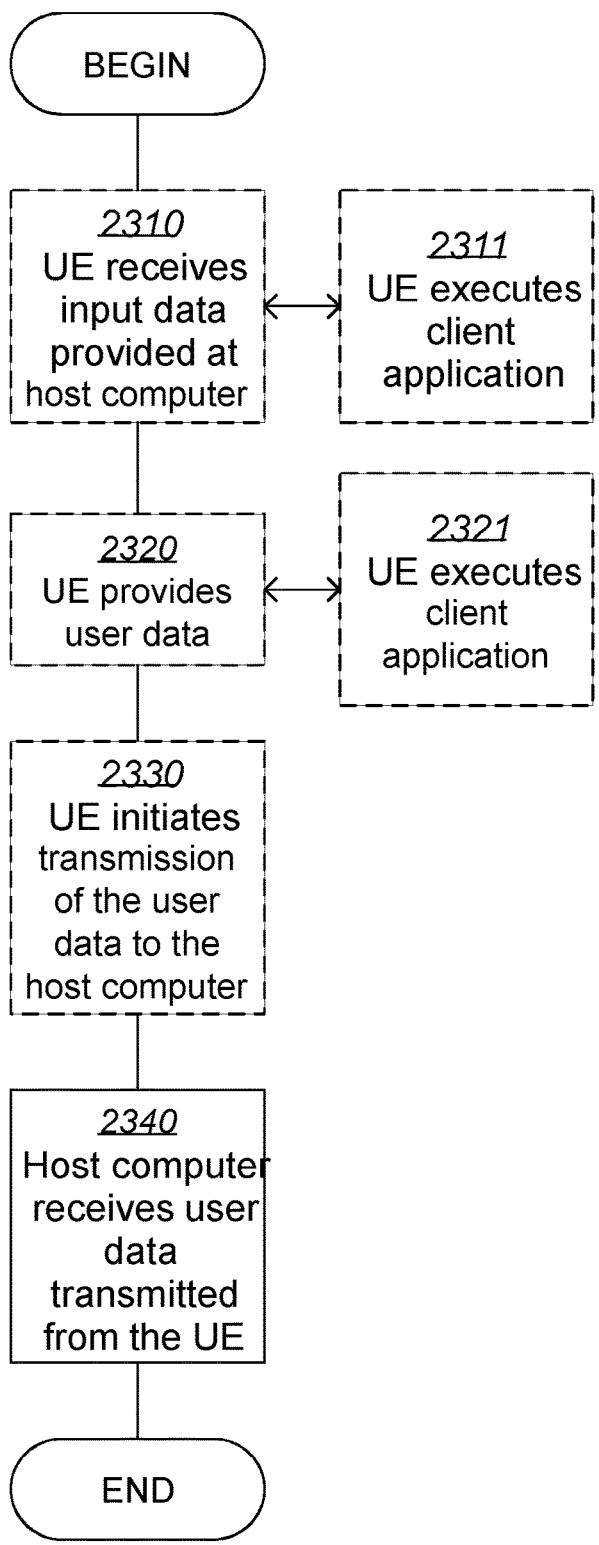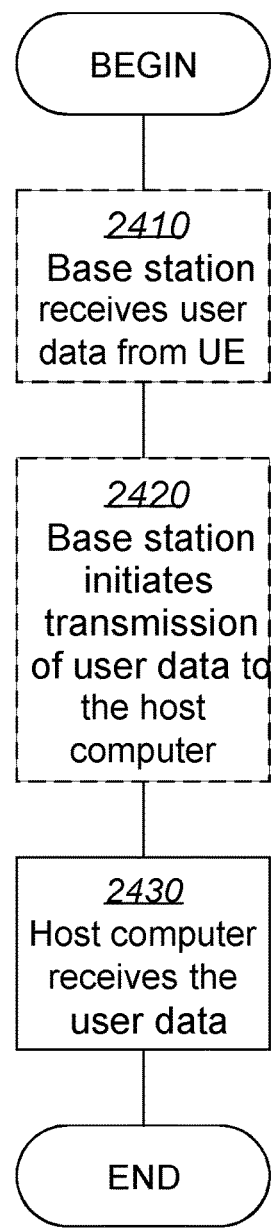
FIG. 23
FIG. 24

METHOD AND NODE INDICATING A FIRST CARRIER IN NB-IOT OPERATING WITHIN NR

CROSS-REFERENCE TO RELATED APPLICATIONS

This application is a 35 U.S.C. § 371 national stage application for International Application No. PCT/SE2019/050089, entitled "FIRST NETWORK NODE, SECOND NETWORK NODE, FIRST WIRELESS DEVICE, AND METHODS PERFORMED THEREBY FOR HANDLING A CARRIER IN A WIRELESS COMMUNICATIONS NETWORK", filed on Feb. 1, 2019, which claims priority from the application U.S. 62/627,386, filed on Feb. 7, 2018, the disclosures and contents of which are hereby incorporated by reference in their entireties.

TECHNICAL FIELD

The present disclosure relates generally to a first network node, and methods performed thereby, for handling a carrier in a wireless communications network. The present disclosure also relates generally to a second network node, and methods performed thereby, for handling a carrier in a wireless communications network. The present disclosure further relates generally to a first wireless device, and methods performed thereby, for handling a carrier in a wireless communications network. The present disclosure further relates generally to computer programs and computer-readable storage mediums, having stored thereon the computer programs to carry out these methods.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g., a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The so-called 5G system, from a radio perspective started to be standardized in 3GPP, and the so-called New Radio (NR) is the name for the radio interface. One of the characteristics of NR is that the frequency range goes to higher frequencies than LTE, e.g., above 6 GHz, where it is known to have more challenging propagation conditions, such as a higher penetration loss. To mitigate some of these effects, multi-antenna technologies such as beamforming may be massively used. Yet another NR characteristic is the use of multiple numerologies in DL and UL in a cell, or for a UE, and/or in different frequency bands. Yet another characteristic is the possibility to enable shorter latencies. NR architecture is being discussed in 3GPP. In the current concept, gNB denotes an NR BS. One NR BS may correspond to one or more transmission/reception points.

Narrowband IoT (NB-IoT)

Cellular communication systems are currently being developed and improved for Machine Type Communication (MTC), a communication characterized by lower demands on data rates than for example mobile broadband, but with higher requirements on e.g., low cost device design, better coverage, and ability to operate for years on batteries without charging or replacing the batteries. Currently, 3GPP is standardizing a feature called Narrowband Internet of Things (NB-IoT) for satisfying all the requirements put forward by MTC type applications, while maintaining backward compatibility with the current LTE radio access technology. At the 3GPP RAN#70 meeting, a new work item named Narrowband IoT (NB-IoT) was approved. The objective is to specify a radio access for cellular internet of things that addresses improved indoor coverage, support for massive number of low throughput devices, low delay sensitivity, ultra-low device cost, low device power consumption and optimized network architecture.

For NB-IoT, three different operation modes are defended, i.e., stand-alone, guard-band, and in-band. In stand-alone mode, the NB-IoT system may be understood to be operated in dedicated frequency bands. For in-band operation, the NB-IoT system may be placed inside the frequency bands used by the current LTE system, while in the guard-band mode, the NB-IoT system may be placed in the guard band used by the current LTE system. By being "placed inside", it may be understood that e.g., one or more of the LTE Physical Resource Blocks (PRBs) may be used by the NB-IoT system, and LTE may not use the PRBs used by NB-IoT. A PRB may be understood as a unit of transmission resource consisting of 12 sub-carriers in the frequency domain, that is, 180 kHz wide in frequency, and 1 timeslot (0.5 ms) in the time domain. The NB-IoT may operate with a system bandwidth of 180 kHz. When multi-PRBs are configured [8], several 180 kHz PRBs may be used, e.g., for increasing the system capacity, inter-cell interference coordination, load balancing, and etc.

FIGS. 1-4 illustrate examples of different scenarios for these different modes of operation, where an anchor carrier and one or more secondary carriers are used.

FIG. 1 is a schematic diagram depicting a scenario wherein an anchor Physical Resource Block (PRB) is inband, and a secondary PRB is inband. In FIG. 1, a first PRB k (PRB k) 1 is an anchor carrier carrying information for two different UEs, UE1 and UE2. A first secondary carrier m (PRB m) 2, carries further information about UE2, and a second secondary carrier j (PRB j) 3, carries further information about UE1. Based on the agreement in [8], "The UE in RRC_IDLE camps on the NB-IoT carrier on which the UE has received NB-PSS/SSS, NB-PBCH and SIB transmissions", a DL Anchor PRB or carrier in embodiments herein may be defined as where the NB-IoT Primar Synchronization Sequence/NB-IoT Secondary Synchronization Sequence (NB-PSS/SSS), NB-IoT Physical Broadcast Channel (NB-PBCH) and System Information Block (SIB) transmissions take place. Based on the agreement in [8], "For initial access, the NB-IoT DL/UL frequency separation is configured by higher layers (SIBx) and is cell-specific", and "After the initial random access procedure success, there can also be a UE specific configuration for the NB-IoT DL/UL frequency separation", a UL anchor PRB or carrier may be defined as the UL frequency that may be signalled to the NB-IoT device via higher layer signalling. It may be noted that, based on the agreement in [8], the UL anchor PRB may be but on a PRB that is not necessarily different from the PRB where the initial random access takes place.

FIG. 2 is a schematic diagram depicting a scenario wherein an anchor PRB is inband, and a secondary PRB is in guardband. In FIG. 2, the PRB k 1, is the anchor carrier and PRB m 2 is the first secondary carrier m. The arrow indicates that a UE may be redirected from the anchor carrier PRB k 1 to the secondary non-anchor carrier PRB m 2 via signaling.

FIG. 3 is a schematic diagram depicting a scenario wherein an anchor PRB is guardband, and a secondary PRB is inband. As in FIG. 2, the PRB k 1, is the anchor carrier and PRB m 2 is the first secondary carrier m. The arrow indicates that a UE may be redirected from the anchor carrier PRB k 1 to the secondary non-anchor carrier PRB m 2 via signaling.

FIG. 4 is a schematic diagram depicting a scenario wherein an anchor carrier is standalone, and secondary carriers are other standalone carriers. In FIG. 4, a first carrier 1 is an anchor carrier carrying information for two different UEs, UE1 and UE2. A first secondary carrier m 2, carries further information about UE2, and a second secondary carrier j 3, carries further information about UE1.

Channel Raster of NB-IoT

The channel raster of the downlink of NB-IoT systems is on a frequency grid of 100 kHz. That is, the NB-IoT devices may be understood to try to find the NB-IoT carriers in a step size of 100 kHz starting a given frequency, e.g., given in a Subscriber Identity Module (SIM) card or programmed in the UE. For example, the UE may start at 900 MHz, and next is 900.1 MHz, and 900.2 Mhz and so on until the UE may find the NB-IoT carrier. For the standalone deployment, the position of an NB-IoT carrier may be centred based on the 100 kHz raster. But for the in-band and guard-band operation, as observed in [2], due to the presence of the Direct Current (DC)-carrier and the fact the center of the PRB is in between two sub-carriers, there is no PRB that falls directly on the cell search grid used in LTE in-band operation. This is because of the band from the 100 kHz raster taken by the DC carrier, which displaces the other carriers from the raster by an frequency offset. The frequency offset to the 100 kHz grid is a minimum of ±2.5 kHz and ±7.5 kHz for even and odd number of PRBs in the LTE system bandwidth, respectively. This is shown in FIG. 5, and detailed description of this problem is given in [2] and [3].

FIG. 5 illustrates the center frequency offsets of LTE PRBs for a carrier with even, top panel, and odd, bottom panel, PRBs. The DC carrier is placed in between of two PRBs, in the case of even number of PRBs, or in the middle of the middle PRB, in the case of odd number cases. As discussed in [2] [3], if a 100 kHz raster is used, not all PRBs may be used for NB-IoT in-band deployment. For the guard-band operation, though the granularity may not need to be 1 PRB, in order to maintain orthogonality to the legacy LTE system and limited to the offset to ±2.5 kHz or ±7.5 kHz from 100 kHz raster grid, only several positions in the LTE guard-band may be used for the NB-IoT downlink anchor carriers [2]. In the evaluations in [4] [5], an ±2.5 kHz and ±7.5 kHz offset from the 100 kHz grid may be accommodated by the cell search process.

To be more specific, for the guard-band operation, as showed in [2], for an LTE system with 10 or 20 MHz system bandwidth, it may be possible to find NB-IoT downlink carrier frequency that is 2.5 kHz off the 100 kHz frequency raster. For other LTE system bandwidth, the offset to the 100 kHz raster may be 52.5 kHz. Therefore, in order to get within the same ±7.5 kHz to the 100 kHz grid, 3 guard subcarriers may be needed. One guard carrier may be 180 kHz width and placed in the same Fast Fourier Transform (FFT) grid at the legacy LTE system that may give orthogonality to the legacy LTE PRB. However, there are no other solutions to put the NB-IoT downlink carriers on the exact 100 kHz raster grids on the LTE guard-band without losing orthogonality to the legacy LTE system. Therefore, an NB-IoT DL carrier that contains synchronization signal and system information, may only be put on a frequency that is near the 100 kHz grid point. The exact raster offset (+/−2.5 kHz or +/−7.5 kHz) in the in-band and guard-band operations may be signalled to the UE via Master Information Block of NB-IoT (MIB-NB). This may allow the UE to further calibrate its oscillator to avoid a potential over-correction due to the raster offset. For standalone operation, no raster offset information is signalled as the UE always assumes that there is no raster offset since the center of the carrier is placed on a 100 kHz grid point.

The ±2.5 kHz or ±7.5 kHz may be handled by the device during the cell search process and then be compensated for [4] [5]. However, these offsets constrain the positions where NB-IoT carriers may be deployed for the in-band and guard-band operations. Therefore, a NB-IoT DL carrier that contains the synchronization signal(s) and system information, may only be put on a frequency that is near the 100 kHz grid point.

For the guard-band operation, as showed in [2] for an LTE system with 10 or 20 MHz system bandwidth, it may be possible to find a NB-IoT downlink carrier frequency that is 2.5 kHz off the 100 kHz frequency raster. For other LTE system bandwidth, the offset to the 100 kHz raster may be 52.5 kHz. Therefore, in order to get within the same ±7.5 kHz to the 100 kHz grid, 3 guard subcarriers may be needed to adjust the NB-IoT carrier to be ±7.5 kHz to the 100 kHz grid. One guard carrier is 15 kHz width and placed in the same Fast Fourier Transform (FFT) grid at the legacy LTE system that gives orthogonality to the legacy LTE PRB. However, there are no other solutions to put the NB-IoT carriers on the exact 100 kHz raster grids on the LTE guard-band without losing orthogonality to the legacy LTE system. In the DL, LTE may be understood to use OFDM. Therefore, the orthogonality may only be maintained if all the subcarriers have the same subcarrier spacing and on the FFT grid.

LTE/NR Spectrum Co-Existence

The next generation cellular access technology is under development in 3GPP. By the end of December 2017, the first 5G NR specifications were approved. In 5G NR, the system may support higher bandwidth as well as different subcarrier spacings. The co-existence between 5G NR and LTE may be understood to be very important, as LTE still has a large market penetration and cover. LTE may be understood to be still needed to provide service for legacy mobile devices, especially for the MTC IoT devices that have a very long-life cycle. Therefore, it may be understood that it is very important to have a good co-existence between 5G NR and LTE.

Reserved Resources

Already at an early point of 3GPP NR discussion, the concept of "reserved resources" as a tool for forward compatibility was agreed. The concept of reserved resources for forward compatibility may be understood to imply that a UE may be configured with a set of resources on which the UE may need to assume no downlink transmission (downlink reserved resources), alternatively on which the UE may need to not transmit (uplink reserved resources) even though it may be configured/scheduled for reception (downlink) or transmission (uplink) on the corresponding resources. In other words, the corresponding resources may be configured to be unavailable regardless of any other configuration and/or any scheduling assignments/grants provided to the UE [9].

More recently, similar functionality has been proposed as a tool to enhance LTE/NR spectrum co-existence [7]. According to the proposal in [7], an NR UE operating in spectrum shared with LTE may be configured such that transmissions avoid resources used for specific LTE physical signals including LTE Cell Specific Reference Signals (CRS), LTE PSS/SSS and LTE Sounding Reference Signals (SRS). In other words, the corresponding resources may be configured as unavailable regardless of any other configuration and/or any scheduling assignments and/or grants that may be provided to the UE. It may be noted that this functionality is very similar to the very basic functionality of NR Physical Downlink Shared Channel (PDSCH) and/or Physical Uplink Shared Channel (PUSCH) transmissions avoiding resources used for transmission of specific NR physical signals such as Synchronization Signal (SS) block, Channel State Information-Reference Signals (CSI-RS) and SRS [7].

From [9], it is stated that:

"The concept of reserved resources can also be used to support NR co-carrier co-existence with LTE-MTC and NB-IoT. Simply speaking, NR resources overlapping with non-dynamically scheduled LTE-MTC and NB-IoT transmissions could be configured as reserved resources, thus allowing for blanking such resources without confusing NR UEs.

In principle this could be achieved by utilizing generic reserved resources. However, assuming such generic reserved resources have limited flexibility, this may not be the most efficient approach. As an example, in case generic reserved resources can only be configured on a per-OFDM-symbol basis, avoiding LTE CRS would mean that an entire NR OFDM symbol would have to be reserved even though only a subset of the resource elements within that symbol coincides with LTE CRS.

Higher efficiency could be achieved if it would be possible to configure reserved resources with specific time/frequency structures matching non-dynamically scheduled LTE-MTC and NB-IoT signals."

According to the foregoing, it is possible to reserve resource in the 5G NR system that may be used for NB-IoT.

However, NR was developed after NB-IoT has been standardized. Therefore, no methods currently exist to regulate or handle the co-existence of NB-IoT with NR. Co-existence of NB-IoT with NR with existing methods may thus lead to interference and wasted resources, both on the network side and on the wireless device side.

SUMMARY

It is an object of embodiments herein to improve the co-existence of NB-IoT carrier and NR in a wireless communications network.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

According to a first aspect of embodiments herein, the object is achieved by a method performed by a first network node operating in a wireless communications network. The first network node initiates sending a first indication to a first wireless device operating in the wireless communications network using NB-IoT. The first indication indicates that a first carrier, the first carrier being a standalone NB-IoT carrier operating within a NR carrier, is: a) deployed in one of: a guardband mode and an inband mode, and b) shifted away by a frequency offset from a frequency channel raster grid used by the first wireless device.

According to a second aspect of embodiments herein, the object is achieved by a method performed by a second network node operating in the wireless communications network. The second network node initiates sending a fifth indication to a second wireless device operating in the wireless communications network. The second wireless device is served by the second network node. The fifth indication indicates that a set of resources corresponding to the first carrier, the first carrier being the standalone NB-IoT carrier operating within the NR carrier, are reserved.

According to a third aspect of embodiments herein, the object is achieved by a method performed by the second wireless device operating in the wireless communications network. The second wireless device receives the fifth indication from the second network node operating in the wireless communications network. The second wireless device is served by the second network node. The fifth indication indicates that the set of resources corresponding to the first carrier, the first carrier being the standalone NB-IoT carrier operating within a NR carrier, are reserved. The second wireless device then rate matches based on the received fifth indication.

According to a fourth aspect of embodiments herein, the object is achieved by the first network node configured to operate in the wireless communications network. The first network node is further configured to initiate sending the first indication to the first wireless device configured to operate in the wireless communications network using NB-IoT. The first indication is further configured to indicate that the first carrier, the first carrier being configured to be the standalone NB-IoT carrier operating within the NR carrier is: a) deployed in one of: the guardband mode and the inband mode, and b) shifted away by the frequency offset from the frequency channel raster grid configured to be used by the first wireless device.

According to a fifth aspect of embodiments herein, the object is achieved by the second network node configured to operate in the wireless communications network. The second network node is further configured to initiate sending the fifth indication to the second wireless device configured to operate in the wireless communications network. The second wireless device is configured to be served by the second network node. The fifth indication is configured to indicate that the set of resources corresponds to the first carrier. The first carrier is configured to be the standalone NB-IoT carrier operating within the NR carrier, are reserved.

According to a sixth aspect of embodiments herein, the object is achieved by the second wireless device configured to operate in the wireless communications network. The second wireless device is further configured to receive the fifth indication from the second network node configured to operate in the wireless communications network. The second wireless device is configured to be served by the second network node. The fifth indication is configured to indicate that the set of resources corresponding to the first carrier, the first carrier being configured to be the standalone NB-IoT carrier operating within the NR carrier, are reserved. The second wireless device is further configured to rate match based on the fifth indication configured to be received.

By the first network node initiating sending the first indication to the first wireless device, operation of the first carrier is enabled in standalone mode, with minimum resource reserved from the NR carrier, and a legacy LTE network may not need to be maintained in operation just to enable service to NB-IoT UEs. Therefore, embodiments herein both enable co-existence of the NB-IoT carrier inside an NR carrier, and minimize the resource that may need to be reserved inside an NR carrier. This is further enabled by the second network node configuring the set of resources as reserved resources, and initiating sending the fifth indication to the second wireless device, which supports the co-existence of the NR carrier with the first carrier, which is an NB-IoT carrier. This is facilitated by enabling to blank the set of resources without confusing the second wireless device.

BRIEF DESCRIPTION OF THE DRAWINGS

Examples of embodiments herein are described in more detail with reference to the accompanying drawings, and according to the following description.

FIG. 23 is a flowchart depicting embodiments of a method in a communications system including a host computer, a base station and a user equipment, according to embodiments herein.

FIG. 24 is a flowchart depicting embodiments of a method in a communications system including a host computer, a base station and a user equipment, according to embodiments herein.

DETAILED DESCRIPTION

Figure 1:
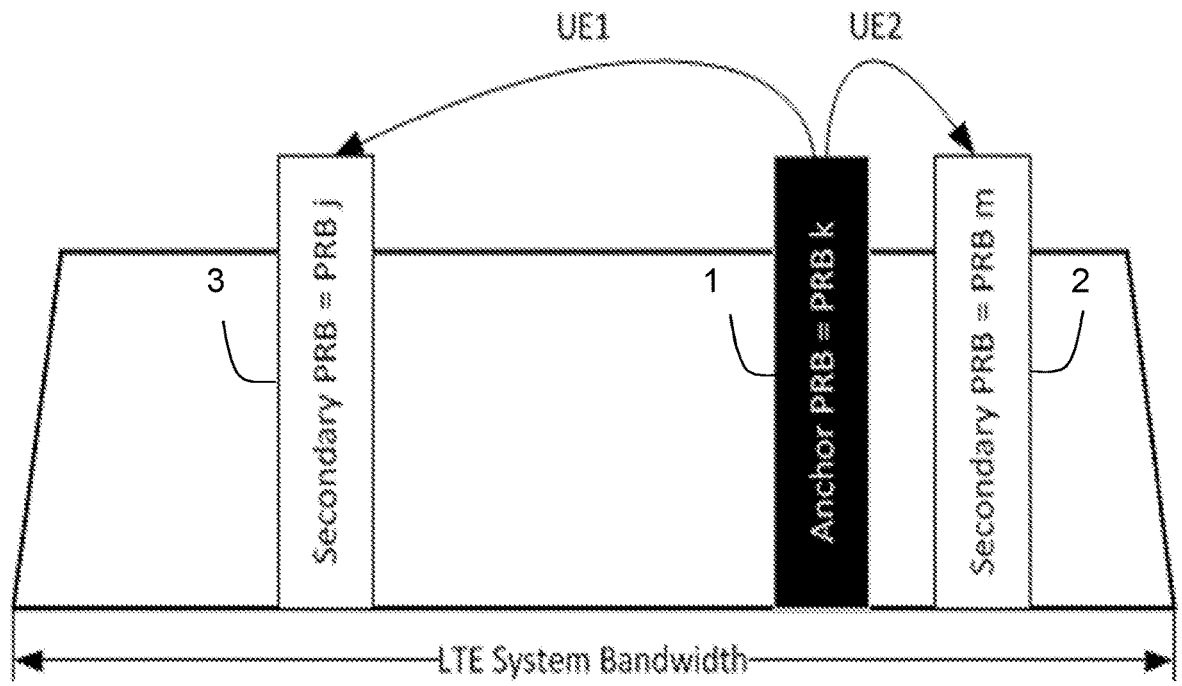
FIG. 1 is a schematic diagram depicting a scenario wherein an anchor PRB is inband, and secondary PRBs are inband.
Figure 2:
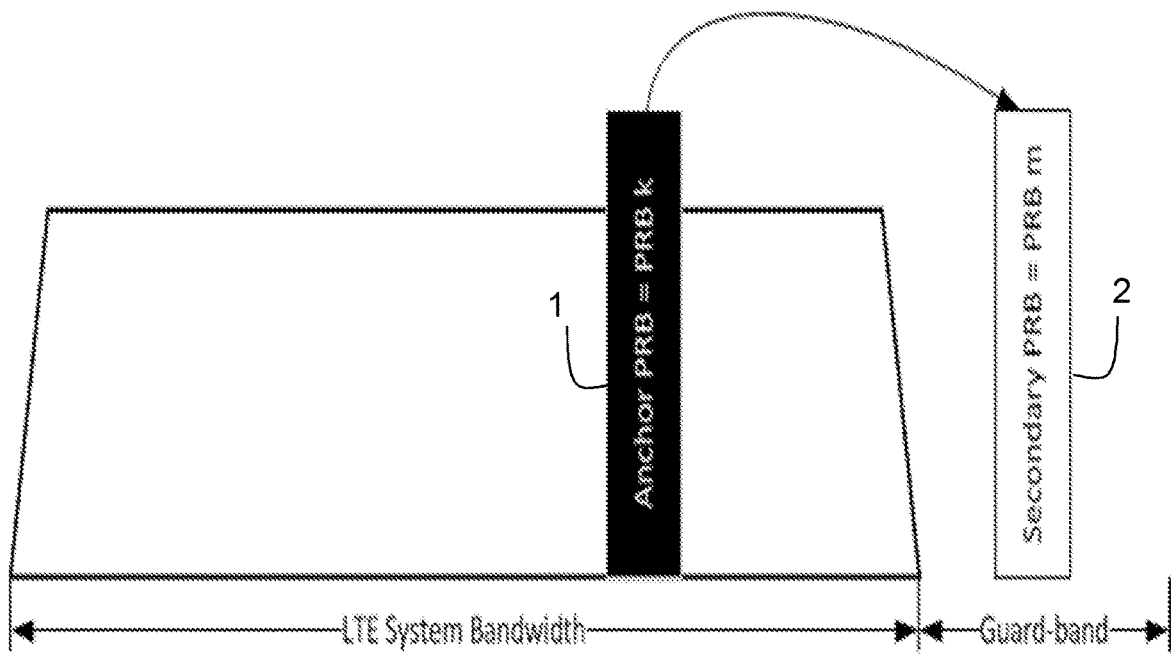
FIG. 2 is a schematic diagram depicting a scenario wherein an anchor PRB is inband, and a secondary PRB is in guardband.
Figure 3:
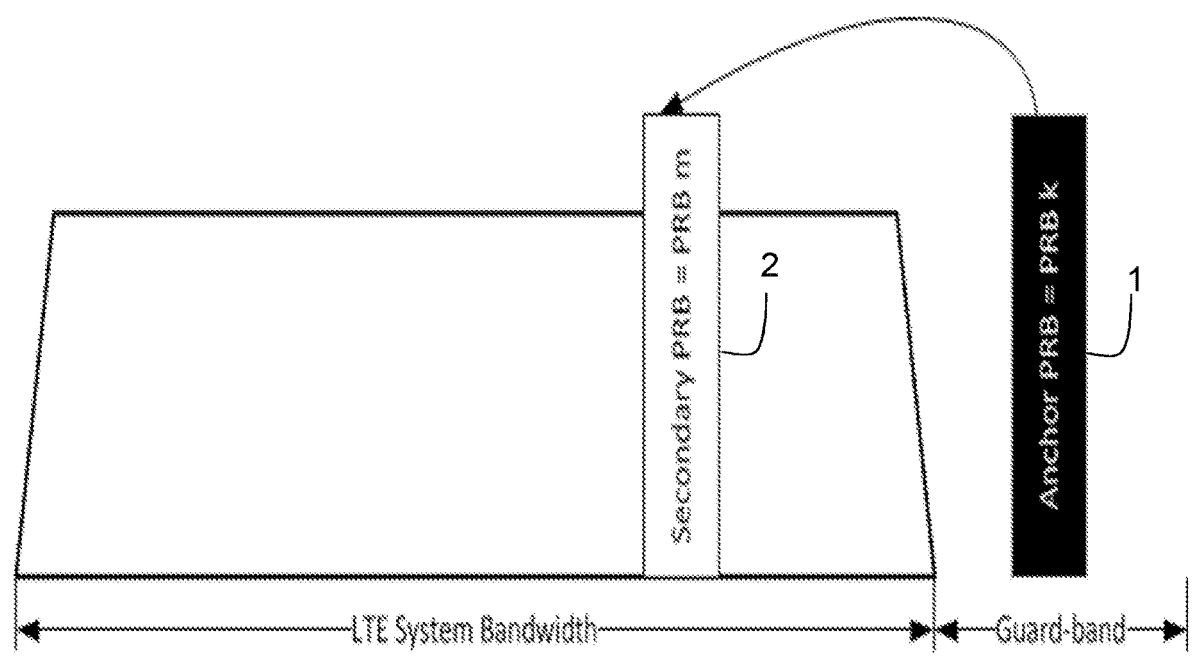
FIG. 3 is a schematic diagram depicting a scenario wherein an anchor PRB is guardband, and a secondary PRB is inband.
Figure 4:
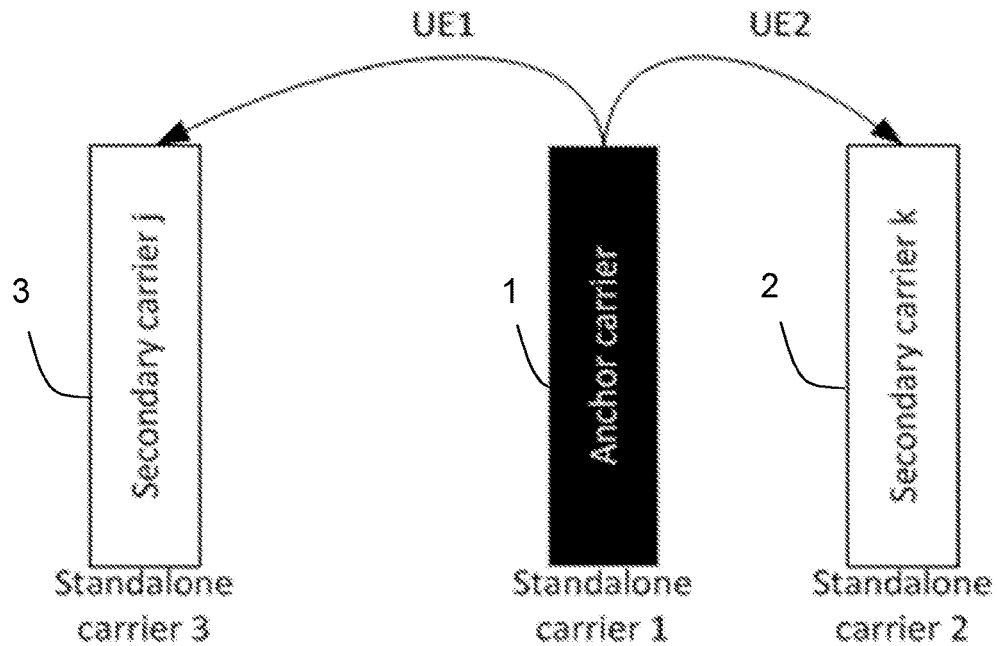
FIG. 4 is a schematic diagram depicting a scenario wherein an anchor carrier is standalone, and secondary carriers are other standalone carriers.
Figure 5:
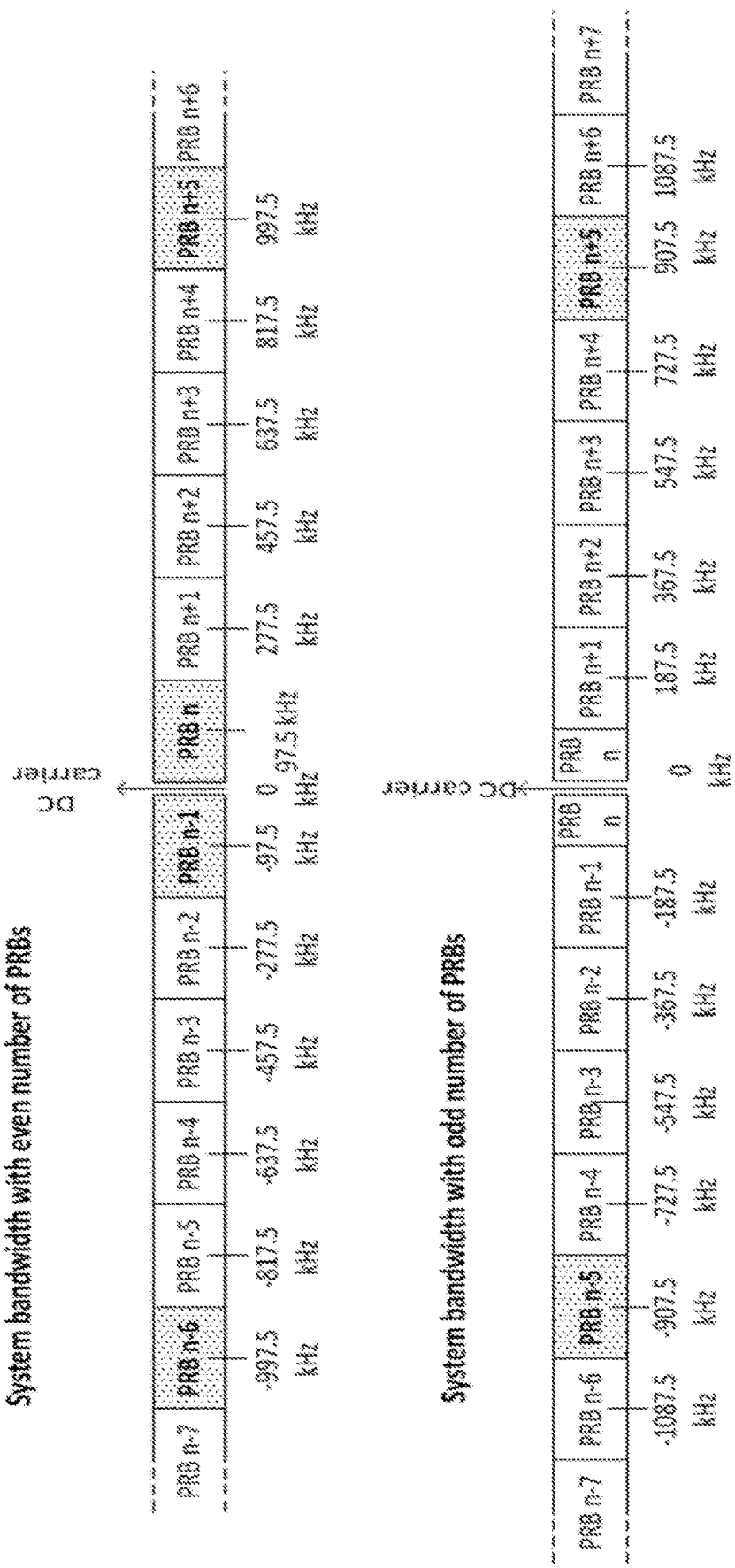
FIG. 5 is a schematic diagram depicting center frequency offset of LTE PRBs for carriers with even and odd number of PRBs.

As part of the development of embodiments herein, one or more problems with the existing technology will first be identified and discussed.

As stated earlier, NR was developed after NB-IoT has been standardized. Therefore, no methods currently exist to regulate or handle the co-existence of NB-IoT with NR.

One possible way to enable deployment of a Narrow Band-Internet of Things (NB-IoT) carrier may be through refarming. That is, several narrower carriers may be shut down and the bandwidth may be used for a wideband system. One problem after refarming is that the operator may still need to provide service to legacy UEs. The NB-IoT UEs may be expected to have a life cycle of 10 years or more. Therefore, one solution may be to have some small bandwidth to be reserved at the band edge(s) for NB-IoT systems in order to avoid hindrance of legacy systems. However, the limitation here is that it is difficult to expand the NB-IoT system(s) in the future. Another way may be to reserve spectrum within the 5G New Radio (NR) carrier, to operate the NB-IoT system(s), which may only require 180 kHz per NB-IoT carrier. The limitation here is that the NB-IoT devices may not be aware of the NR carrier, and if the NB-IoT carrier is operating in a standalone mode, due to the channel raster requirements, there may be a loss of orthogonality between the NB-IoT subcarriers and 5G NR subcarriers. Therefore, more spectrum may need to be reserved in the NR to serve as guard, which reduces the 5G NR spectrum efficiency.

As discussed above, it is possible to reserve resource in the 5G NR system that may be used for NB-IoT. But the NB-IoT devices are not aware of the NR carrier, as NR was developed after NB-IoT has been standardized. Therefore, there is no solution to make the NB-IoT devices to be aware of the NB-IoT carrier is within the NR carrier and adjust themselves to adapt to NR-inband deployment, e.g., by applying an offset.

The NB-IoT inband/guardband deployment modes only work with LTE, which assumes the NB-IoT carrier is within an LTE system or in the guard band of an LTE system. As mentioned before, the NB-IoT anchor carrier placement is constrained by the channel raster. This constraint also applies if we deploy the NB-IoT carrier inside an NR carrier.

Directly putting a standalone NB-IoT carrier inside an NR carrier, due to the channel raster offset, it is problematic due to the non-orthogonality of the subcarriers. NR in the DL may also be Orthogonal Frequency Division Multiple Access (OFDMA) based, but without several different choices of subcarrier spacing. In other words, subcarrier spacing in NR may be considered to be not well suited for NB-IoT co-existence. It may be possible to reserve more bandwidth from NR as guard between an NR and an NB-IoT carrier to reduce the interference from the NB-IoT carrier to the NR carrier caused by the non-orthogonality, but this means the NR spectrum efficiency is reduced.

Therefore, with existing methods, co-existence of NB-IoT standalone carriers and NR carriers may lead to reduced spectrum efficiency due to lack of orthogonality.

Certain aspects of the present disclosure and their embodiments may provide solutions to this challenge or other challenges. There are, proposed herein, various embodiments which address one or more of the issues disclosed herein.

Embodiments herein may be understood to address this problem in existing methods by providing a novel way of automatically configuring NB-IoT networks. Particular embodiments herein may be understood to be related to enabling NB-IoT Standalone deployment within NR, that is, enabling standalone NB-IoT carriers to be deployed within NR system bandwidth. Particular embodiments herein may also be understood to be related to offering dynamic UL configurations of NB-IoT system.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 6:
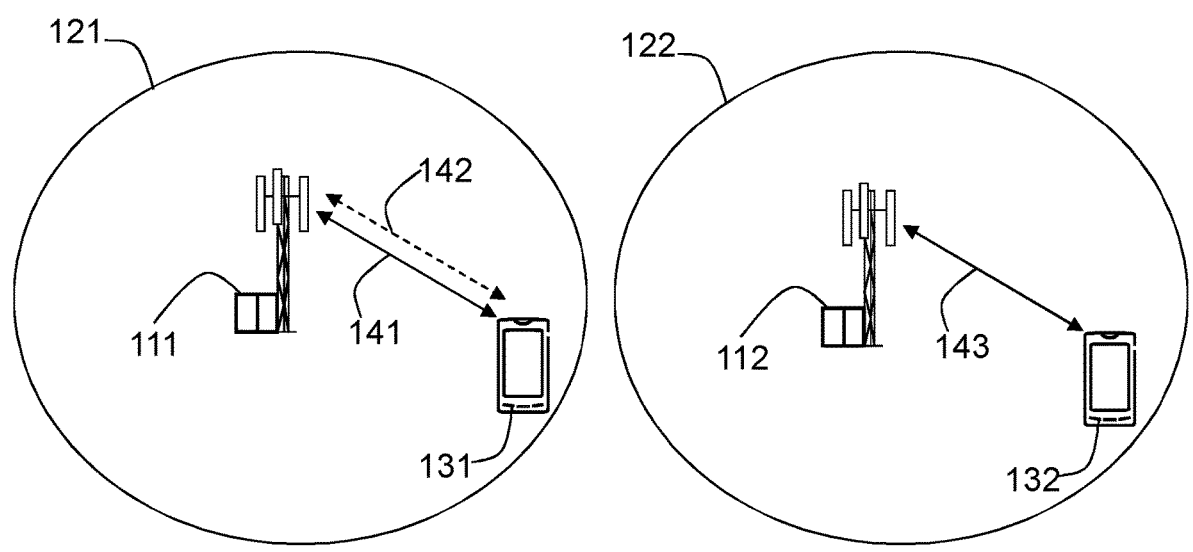
FIG. 6 is a schematic diagram illustrating a wireless communications network, according to embodiments herein.

FIG. 6 depicts a non-limiting example of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may alternatively be a younger system than a 5G system The wireless communications network 100 may support one or multiple wireless communication standards and/or technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band. Thus, although terminology from 5G/NR and LTE may be used in this disclosure to exemplify embodiments herein, this should not be seen as limiting the scope of the embodiments herein to only the aforementioned system.

The wireless communications network 100 comprises a plurality of network nodes, whereof a first network node 111 and a second network node 112 are depicted in the non-limiting example of FIG. 6. Each of the first network node 111 and the second network node 112 may be a radio network node, such as a radio base station, or any other network node with similar features capable of serving a wireless device, such as a user equipment or a machine type communication device, in the wireless communications network 100. In typical embodiments, the first network node 111 may radio base station operating on LTE, such as an eNB. In some examples, the first network node 111 may operate on Global System for Mobile Communication (GSM). In some examples, the first network node 111 may operate on standalone NB-IoT. The second network node 112 is a transmission point operating on NR, for example a New Radio (NR) NodeB (gNB).

The wireless communications network 100 covers a geographical area which may be divided into cell areas, wherein each cell area may be served by a network node, although, one radio network node may serve one or several cells. The wireless communications network 100 comprises at least a first cell 121 and a second cell 122. In the non-limiting example depicted in FIG. 6, the first network node 111 serves the first cell 121 and the second network node 112 serves the second cell 122. Each of the first network node 111 and the second network node 112 may be of different classes, such as, e.g., macro base station (BS), home BS or pico BS, based on transmission power and thereby also cell size. Each of the first network node 111 and the second network node 112 may be directly connected to one or more core networks, which are not depicted in FIG. 6 to simplify the Figure. In some examples, each of the first network node 111 and the second network node 112 may be a distributed node, such as a virtual node in the cloud, and it may perform its functions entirely on the cloud, or partially, in collaboration with a radio network node.

A plurality of wireless devices are located in the wireless communication network 100, whereof a first wireless device 131 and a second wireless device 132, which may also be referred to as a first device and a second device, respectively, are depicted in the non-limiting example of FIG. 6. Each of the first wireless device 131 and the second wireless device 132 may be a wireless communication device which may also be known as e.g., a mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The first wireless device 131 is a NB-IoT device, e.g., a UE. The second wireless device 132 is a 5G UE.

Each of the first wireless device 131 and the first network node 111 may be configured to communicate in the wireless communications network 100 with each other over a first carrier 141, e.g., a radio link, and a second carrier 142, e.g., a radio link. The first carrier 141 may be, in some examples, an anchor NB-IoT carrier. The second carrier 142 may be, in some examples, a non-anchor carrier. Each of the second wireless device 132 and the second network node 112 may be configured to communicate in the wireless communications network 100 with each other over a third carrier 143, e.g., a radio link. The third carrier 143 is an NR carrier.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth" and/or "fifth" herein may be understood to be an arbitrary way to denote different elements or entities, and may be understood to not confer a cumulative or chronological character to the nouns they modify.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are: a) embodiments related to a first network node, such as the first network node 111, e.g., an eNB; b) embodiments related to a second network node, such as the second network node 112, e.g., a gNB; and b) embodiments related to a wireless device, such as the second wireless device 131, e.g., a UE.

Figure 7:
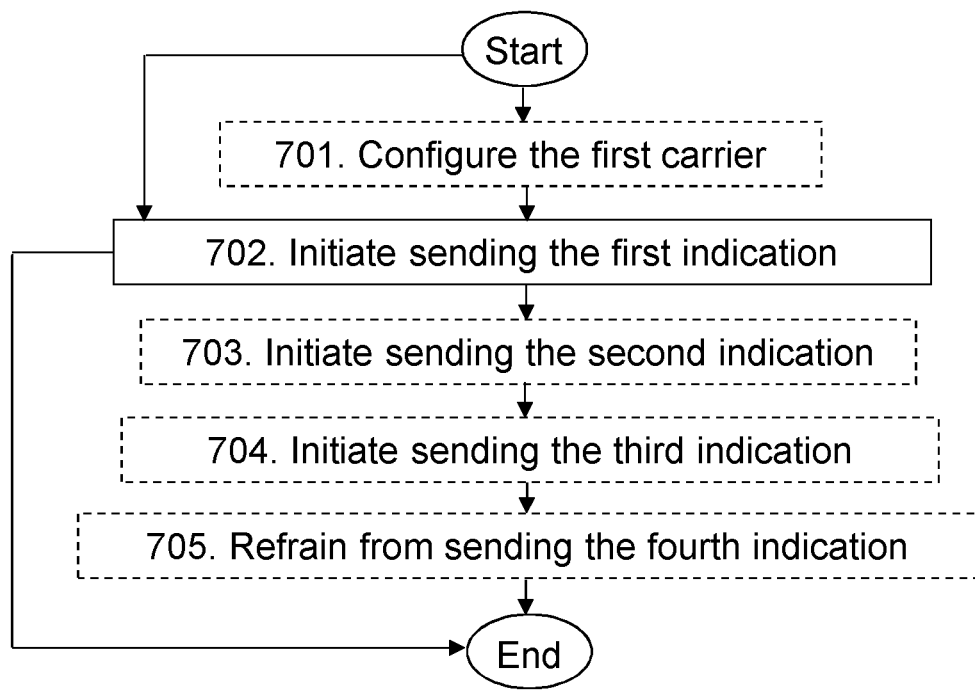
FIG. 7 is a flowchart depicting a method in a first network node, according to embodiments herein.

Embodiments of a method, performed by the first network node 111, will now be described with reference to the flowchart depicted in FIG. 7. The method may be understood to be for handling a carrier in a wireless communications network 100. The first network node 111 operates in the wireless communications network 100. In some embodiments, the first network node 111 may operate in the wireless communications network 100 using NB-IoT.

Several embodiments are comprised herein. In some embodiments all the actions may be performed. In some embodiments, one or more actions may be performed. One or more actions may be optional. In FIG. 7, optional actions are indicated with dashed lines. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 7.

Action 701

In order to have good co-existence between the NB-IoT system and 5G NR, in the wireless communications network 100, in this Action 701, the first network node 111 may configure the first carrier 141 to operate within an NR carrier, e.g., the third carrier 143. The first carrier 141 is a standalone Narrow Band-Internet of Things (NB-IoT) carrier. If the NB-IoT carrier is operating in a standalone mode, due to the channel raster requirements, there may be a loss of orthogonality between the NB-IoT subcarriers and 5G NR subcarriers, and that therefore, more spectrum may need to be reserved in the NR to serve as guard, which reduces the 5G NR spectrum efficiency. In order to enable the deployment of the first carrier 141 within the NR carrier in an effective way, without requiring to reserve unnecessary spectrum, in this Action 701, the first network node 111 may configure the first carrier 141 to be: a) deployed in one of: a guardband mode and an inband mode, and b) shifted away by a frequency offset from a frequency channel raster grid used by the first wireless device 131. The first wireless device 131 operates in the wireless communications network 100 using NB-IoT.

The first wireless device 131 may be served by the first network node 111.

By the first network node 111 configuring the first carrier 141 to operate within the NR carrier in guardband or inband mode, operation of the first carrier 141 is enabled, within the NR carrier, in standalone mode, with minimum resource reserved from the NR carrier. This may be understood to be advantageous because by being enabled to be deployed as a standalone carrier, a legacy LTE network may not need to be maintained in operation just to enable service to NB-IoT UEs. Therefore, co-existence of the NB-IoT carrier inside an NR carrier is enabled, and the resource that may need to be reserved inside an NR carrier may be minimized.

The frequency channel raster grid may be understood to be used by the first wireless device 131 to search for anchor NB-IoT channels.

The frequency channel raster grid may be 100 kHz. The frequency offset may be ±2.5 kHz or ±7.5 kHz.

NB-IoT may be understood as an example of a first Radio Access Technology (RAT). Statements herein referring to NB-IoT may be understood to equally refer to a first RAT, having similar characteristics to those of NB-IoT, as discussed herein.

NR may be understood as an example of a second RAT. Statements herein referring to NR may be understood to equally refer to a second RAT, having similar characteristics to those of NR, as discussed herein.

The first network node 111 may typically operate in the wireless communications network 100 using Long Term Evolution (LTE). LTE may be considered an example of a third RAT. Statements herein referring to LTE may be understood to equally refer to a third RAT, having similar characteristics to those of LTE, as discussed herein. In some examples, the first network node 111 may operate on GSM.

Action 702

In this Action 702, the first network node 111 initiates sending a first indication to the first wireless device 131 operating in the wireless communications network 100 using NB-IoT. The first indication indicates that the first carrier 141, the first carrier 141 being a standalone NB-IoT carrier operating within the NR carrier is: a) deployed in one of: the guardband mode and the inband mode, and b) shifted away by the frequency offset from the frequency channel raster grid used by the first wireless device 131.

The initiating sending may be understood herein as triggering, starting, or enabling the sending or transmitting.

In some embodiments, the initiating sending in this Action 701 may be performed via one of: a) Master Information Block (MIB), b) Radio Resource Control (RRC), signaling sent on a NarrowBand Physical Broadcast Channel (NPBCH), and c) system information block (SIB).

By initiating sending the first indication to the first wireless device 131 in this Action 702, deployment of a standalone NB-IoT carrier in standalone mode within the NR is enabled, since the first network node 111 may use signalling the first communication device 131 may already support, such as guardband mode within an LTE carrier and inband mode within an LTE carrier.

Action 703

In a first example of embodiments herein, after turning on the 5G NR carrier, NB-IoT may become inside NR. The standalone NB-IoT DL anchor carrier may be shifted by either +/−2.5 kHz or +/−7.5 kHz away from the 100 kHz raster grid. And the NB-IoT MIB-NB may be reconfigured to indicate the NB-IoT system is operating in a guardband or inband mode with a different Physical Cell Identifier (PCI) compared to the host carrier (inband-DifferentPCI Information Element (IE) set). The MIB-NB may be updated to include the +/−2.5 kHz or +/−7.5 kHz raster offset also.

In another example of embodiments herein, an NB-IoT anchor carrier, e.g., the first carrier 141, operating inside an LTE host carrier using the inband mode with the same PCI as the LTE carrier (inband-SamePCI IE set), may be refarmed to operate within a NR carrier. The NB-IoT MIB may be reconfigured to indicate that the NB-IoT carrier is operating either in guardband mode, or inband mode with a different PCI compared to the host carrier (inband-DifferentPCI IE set).

According to the foregoing, in this Action 703, the first network node 111 may initiate sending a second indication to the first wireless device 131. The second indication may indicate that the first carrier 141 is operating with a different Physical Cell Identifier (PCI), than an assumed LTE carrier. The first carrier 141 may be an anchor NB-IoT carrier. The second indication may be, for example, an "inband-DifferentPCI" IE set.

Assumed LTE carrier may be understood to refer to the fact that the LTE carrier as such does not exist, however the first wireless device 131 is led to assume it is there based on the first indication received form the first network node 111.

The sending may be performed, for example, via a radio link, e.g., on LTE, between the first network node 111 and the first wireless device 131.

Action 704

In another example of embodiments herein, a non-anchor NB-IoT carrier, e.g., the second carrier 142, that may be used for paging and random access, may be operating in inband mode together with an anchor carrier. If the carriers are refarmed to operate inside a NR carrier and the anchor may be reconfigured to guardband mode of operation in MIB, see the example of embodiments herein described in Action 703, then also the non-anchor used for paging and random access may be reconfigured using SIB22-NB to indicate that it is no longer located within a LTE carrier.

According to the foregoing, in this Action 704, the first network node 111 may initiate sending a third indication to the first wireless device 131. The third indication may indicate that the second carrier 142 may be deployed in the guardband mode or in the inband mode. The second carrier 142 may be a non-anchor NB-IoT carrier.

The third indication may be an SIB22-NB message.

The sending may be performed, for example, via a radio link, e.g., on LTE, between the first network node 111 and the first wireless device 131.

Action 705

In some embodiments, to reconfigure the non-anchor used for paging and random access to indicate that it is no longer located within a LTE carrier, may be achieved by not signalling the SIB22-NB inbandCarrierInfo-r14 IE. In accordance with this, in Action 705, the first network node 111 may refrain from sending a fourth indication to the first wireless device 131. The fourth indication may be an information element comprising NB inband carrier information, e.g., the SIB22-NB inbandCarrierInfo-r14 IE.

Figure 8:
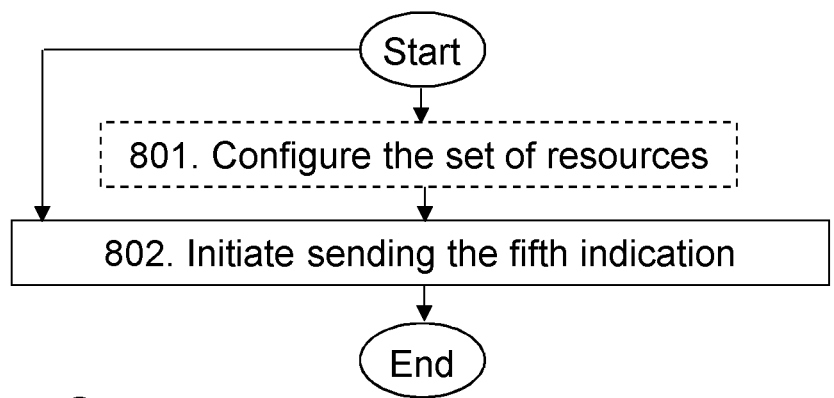
FIG. 8 is a flowchart depicting a method in a second network node, according to embodiments herein.

Embodiments of a method, performed by the second network node 112, will now be described with reference to the flowchart depicted in FIG. 8. The method may be understood to be for handling a carrier in a wireless communications network 100. The second network node 112 operates in the wireless communications network 100. In some embodiments, the second network node 112 may operate in the wireless communications network 100 using NR.

Several embodiments are comprised herein. In some embodiments all the actions may be performed. In some embodiments, one action may be optional. In FIG. 8, the optional action is indicated with dashed lines. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. In FIG. 8, optional actions are indicated with dashed lines. Some actions may be performed in a different order than that shown in FIG. 8.

The detailed description of some of the following corresponds to the same references provided above, in relation to the actions described for the user equipment 130, and will thus not be repeated here to simplify the description. For example, the frequency channel raster grid may be 100 kHz.

Action 801

In order to enable co-existence of NB-IoT in an New Radio (NR) wireless communications network 100, in this Action 801, the second network node 112 may configure a set of resources as reserved resources. The set of resources may correspond to the first carrier 141, the first carrier 141 being a standalone NB-IoT carrier operating within the NR carrier.

The set of resources may be understood to be radio resources. Corresponding to the first carrier 141 may be understood to mean comprising the frequency range used by the first carrier 141.

The set of resources which may be reserved may further comprise a guard spectrum around the first carrier 141.

In some embodiments, the set of resources which may be reserved may further comprise a predetermined number of symbols, slots, and/or subframes.

The guard spectrum may comprise NB-IoT subcarriers on a first subcarrier grid, the first subcarrier grid being different than a second subcarrier grid of NR.

The frequency channel raster grid may be 100 kHz. The frequency offset may be ±2.5 kHz or ±7.5 kHz.

Action 802

In this Action 802, the second network node 112 initiates sending a fifth indication to the second wireless device 132 operating in the wireless communications network 100. The second wireless device 132 is served by the second network node 112. The fifth indication indicates that the set of resources corresponding to the first carrier 141 are reserved. The first carrier 141 is a standalone NB-IoT carrier operating within a NR carrier.

The initiating sending may be understood herein as triggering, starting, or enabling the sending or transmitting.

The set of resources which are reserved may further comprise a guard spectrum around the first carrier 141.

The guard spectrum may comprise NB-IoT subcarriers on a first subcarrier grid, the first subcarrier grid being different than a second subcarrier grid of NR.

A difference between the first subcarrier grid and the second subcarrier grid may be +/−2.7 kHz or +/−7.5 kHz.

In some embodiments, the initiating sending 802 may be performed via one of: a) Master Information Block (MIB), b) Radio Resource Control (RRC), signaling sent on a NarrowBand Physical Broadcast Channel (NPBCH), and c) system information block (SIB).

Figure 9:
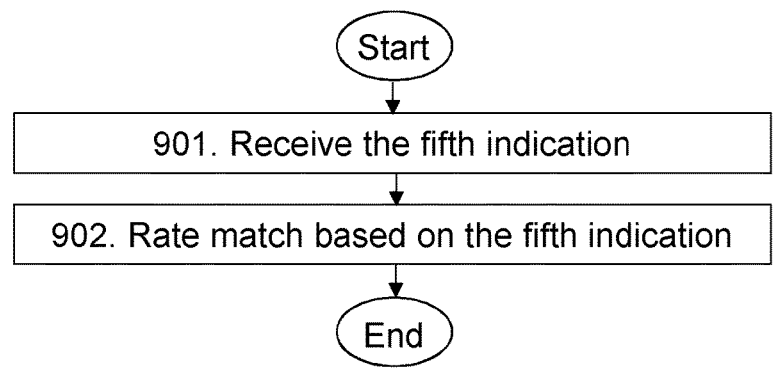
FIG. 9 is a flowchart depicting a method in a second wireless device, according to embodiments herein.

Embodiments of a method, performed by the second wireless device 132, will now be described with reference to the flowchart depicted in FIG. 9. The method may be understood to be for handling a carrier in a wireless communications network 100. The second wireless device 132 operates in the wireless communications network 100. In some embodiments, the second wireless device 132 may operate in the wireless communications network 100 using NB-IoT.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 9.

The detailed description of some of the following corresponds to the same references provided above, in relation to the actions described for the user equipment 130, and will thus not be repeated here to simplify the description. For example, the frequency channel raster grid may be 100 kHz.

Action 901

In order to enable co-existence of NB-IoT in an New Radio (NR) wireless communications network 100, in this Action 901, the second wireless device 132 receives the fifth indication from the second network node 112 operating in the wireless communications network 100. The second wireless device 132 is served by the second network node 112. The fifth indication indicates that the set of resources corresponding to the first carrier 141, the first carrier 141 being a standalone NB-IoT carrier operating within the NR carrier, are reserved.

The set of resources which are reserved may further comprise a guard spectrum around the first carrier 141.

In some embodiments, the set of resources which are reserved may further comprise a predetermined number of symbols, slots, and/or subframes.

The guard spectrum may comprise NB-IoT subcarriers on a first subcarrier grid, the first subcarrier grid being different than a second subcarrier grid of NR.

The frequency channel raster grid may be understood to be used by the second wireless device 132 to search for anchor NB-IoT channels.

The frequency channel raster grid may be 100 kHz. The frequency offset may be ±2.5 kHz or ±7.5 kHz.

In some embodiments, the receiving in this Action 901 may be performed via one of: a) Master Information Block (MIB), b) Radio Resource Control (RRC), signaling sent on a NarrowBand Physical Broadcast Channel (NPBCH), and c) system information block (SIB).

By receiving the fifth indication from the second network node 112 in this Action 901, in some examples of embodiments herein, the 5G NR user devices, such as the second wireless device 132, may be informed of the reserved resource corresponding to resources taken by the NB-IoT carrier, and the 5G NR UEs such as the second wireless device 132 may then be enabled to rate match around these resources. If guard subcarriers are needed around the NB-IoT carrier, e.g., due to the operator choosing to keep the NB-IoT carrier on the same 100 kHz raster point, these guard subcarriers may be also included as the reserved resource for the 5G NR UEs to rate match around them.

Action 902

In this Action 902, the second wireless device 132 rate matches based on the received fifth indication.

In may be understood that any of the first indication, the second indication, the third indication, and the fifth indication may be implemented, in some examples, as one or more indications, respectively.

As a brief overview of embodiments herein, embodiments herein may be understood to provide a novel way to virtualize a standalone NB-IoT carrier to make it possible to place an NB-IoT carrier inside an NR carrier with minimum resource reserved from the NR carrier. Embodiments herein may be understood to both enable co-existence of the NB-IoT carrier inside an NR carrier, and minimize the resource that needs to be reserved inside an NR carrier.

Some embodiments herein will now be further described with some non-limiting examples.

In order to achieve coverage requirement of the NB-IoT systems, compared to the average LTE data channel transmit power, a 6 dB power boosting may be preferred for the downlink of the in-band and guard-band deployment [1]. The power boosting may be understood to be with respect to the legacy data channel. But due to spectrum requirement, this 6 dB power boosting may not be applied at arbitrary places in the guard band. To be more specific, it is stated in [1], that "Feasibility of boosting for transmission in the guard band depends on the system bandwidth, spacing between NB-IoT and LTE, and also the amount of boosting. When NB-IoT is not very close to the edge of the system bandwidth and with proper design of base station equipments, power boosting of up to 6 dB would be feasible."

Certainly, by increasing the number of repetitions, NB-IoT devices without good coverage may still be reached when the transmit power is not high enough. But this is at an expense of the system capacity. This may be very problematic when the network traffic is heavier than usual, e.g., for the case of software and firmware update. Therefore, multi-PRB operations may be proposed in NB-IoT to help to alleviate the problem. When multi-PRB is configured, an NB-IoT may listen to the anchor carrier for system information, but its data transmission may be moved to a secondary PRB. The secondary PRB position(s) may be sent to the NB-IoT devices explicitly, e.g., by RRC configuration or via system information. The positions of the secondary PRB may not be constrained to near the 100 kHz grid. In this way, NB-IoT devices in good coverage may be moved to secondary PRBs with lower power, and NB-IoT devices in bad coverage may be served by PRBs with higher power boosting.

For the uplink operation, the deployment is more flexible, as it may not be necessary to put the UL carrier in a position that is near the 100 kHz grid. That is, the NB-IoT device may get the downlink and uplink carrier gap via system information (it may be configured on an individual UE basis as described in [8]), if the default gap is not applied. Therefore, the placement of the uplink NB-IoT carrier has more flexibility. For the downlink operation, only 15 kHz subcarrier spacing may be used for the NB-IoT system. But for the uplink, two different numerologies, i.e., 3.75 kHz and 15 kHz, of the uplink subcarrier spacing may be defined in NB-IoT, for the single tone uplink transmission. For uplink with multi-tone transmission, only 15 kHz subcarrier spacing may be used.

One common deployment situation is that an operator may re-farm its own frequency bands, e.g., change the frequency bands used for GSM/Code-division multiple access (CDMA)/Wide CDMA (WCDMA)/LTE systems to 5G NR. In such cases, some of the carriers of the systems may be shut down and used for new systems. But in order still to provide service to legacy users, some of the carriers of the legacy system may keep on providing their services.

Figure 10:
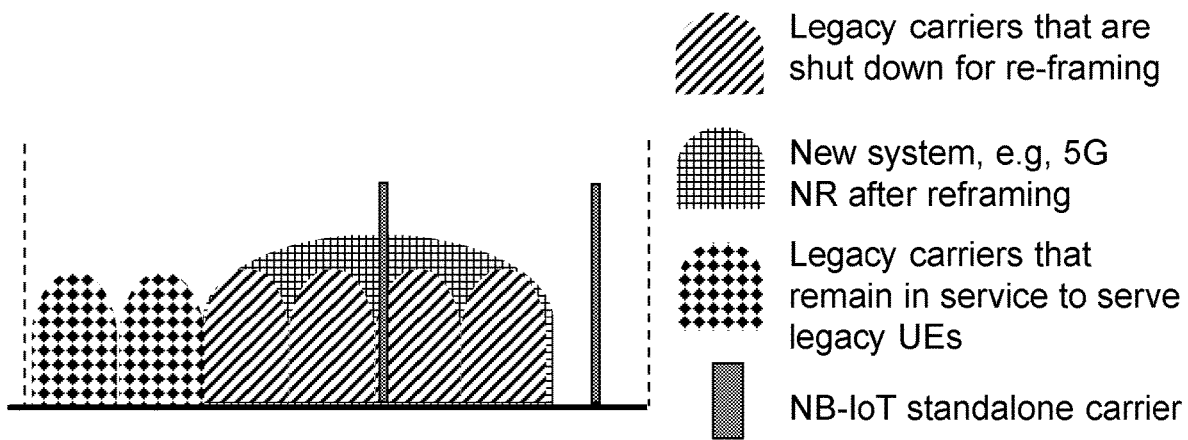
FIG. 10 is a schematic diagram depicting an example of a re-farming scenario.

One example is given in FIG. 10. In this example, several narrower carriers are shut down and the bandwidth is used for a wideband system. One problem after refarming is that the operator may still need to provide service to legacy UEs. The NB-IoT UEs may be expected to have a life cycle of 10 years or more. Therefore, one solution is to have some small bandwidth to be reserved at the band edge(s) for NB-IoT systems. However, the limitation here is that it may be difficult to expand the NB-IoT system(s) in the future. Another way is to reserve spectrum within the 5G NR carrier, to operate the NB-IoT system(s), which may only require 180 kHz per NB-IoT carrier. The limitation here is that the NB-IoT devices are not aware of the NR carrier, and if the NB-IoT carrier is operating in a standalone mode, due to the channel raster requirements, there is a loss of orthogonality between the NB-IoT subcarriers and 5G NR subcarriers. Therefore, more spectrum needs to be reserved in the NR to serve as guard, which reduces the 5G NR spectrum efficiency.

In order to have good co-existence between NB-IoT system and 5G NR, embodiments herein provide for a novel way to virtualize the standalone NB-IoT carrier to inband or guardband mode. Here, inband or guardband modes may be understood to refer to be inside an LTE system or in the guardband of an LTE system.

Figure 11:
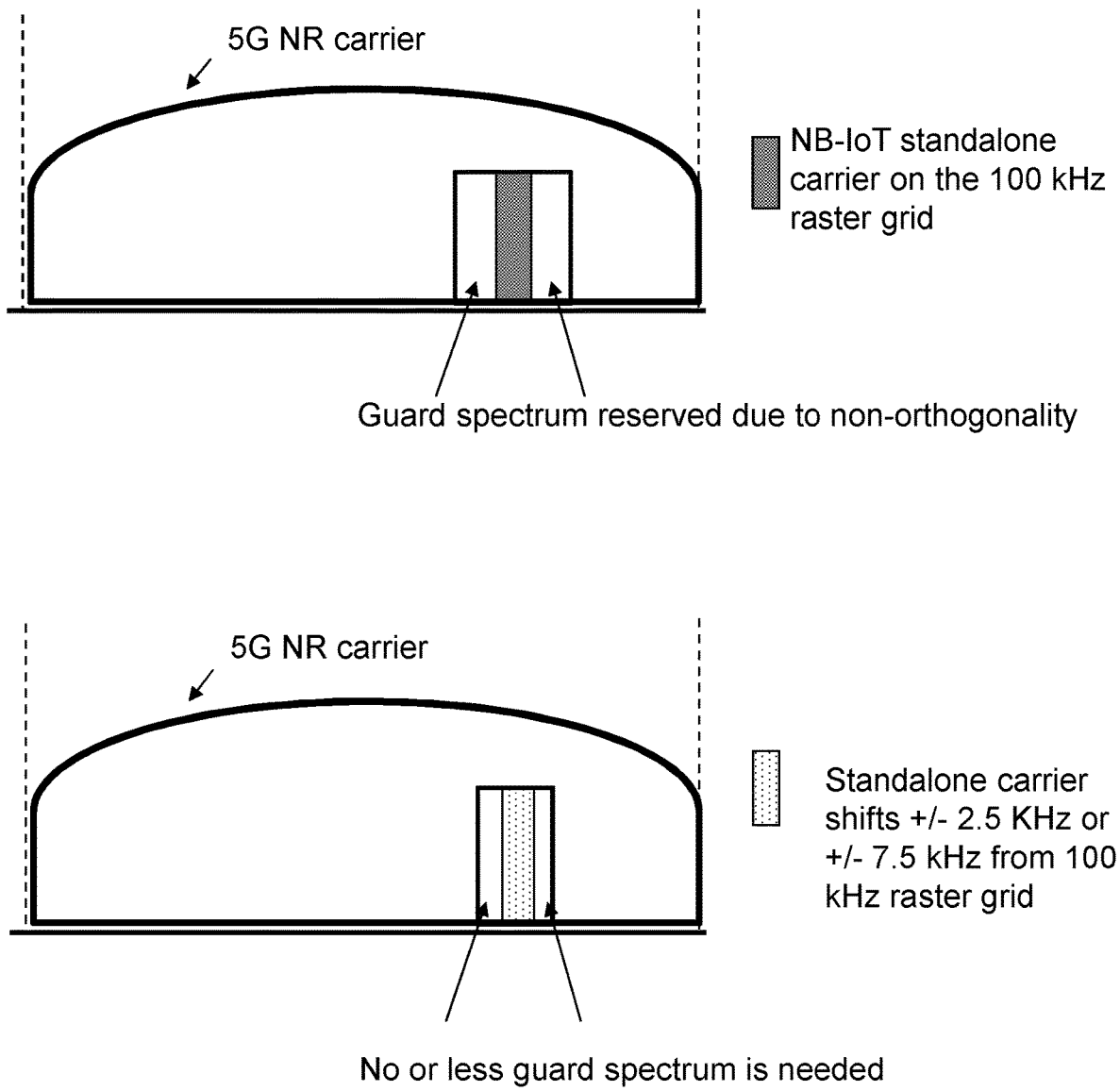
FIG. 11 is a schematic diagram depicting an example of a virtualized standalone NB-IoT carrier as in an inband/guardband operation mode.

FIG. 11 illustrates some of these aspects. As can be seen from the figure, a standalone NB-IoT carrier(s) may be configured as inband or guardband and may be deployed inside a 5G NR carrier. However, the operation mode of this carrier may be indicated to be as inband or guardband, e.g., by the first indication. As the operation mode of an NB-IoT system is signalled in the MIB-NB, the first indication may indicate in the MIB that the NB-IoT operates in inband or guardband mode, but the actual NB-IoT carrier may be a standalone carrier that is deployed inside an 5G NR carrier.

It may be noted that FIG. 11 is a non-exclusive example. The scenarios apply for both for UL and DL.

Certain embodiments may provide one or more of the following technical advantage(s), which may be summarized as a novel way to virtualize the standalone NB-IoT carrier to make it possible to place an NB-IoT carrier inside an NR carrier with minimum resource reserved from the NR carrier. Embodiments herein both enable co-existence of the NB-IoT carrier inside an NR carrier, and minimize the resource that may need to be reserved inside an NR carrier.

Figure 12:
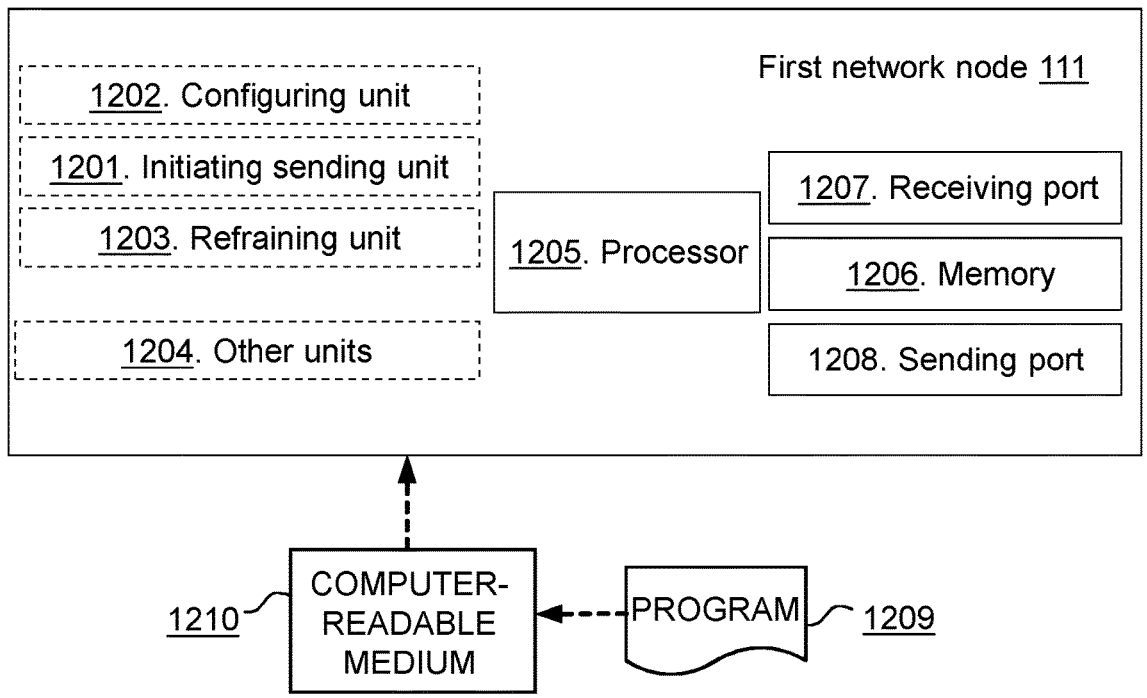
FIG. 12 is a schematic block diagram illustrating two non-limiting examples, a) and b), of a first network node, according to embodiments herein.
Figure 12:
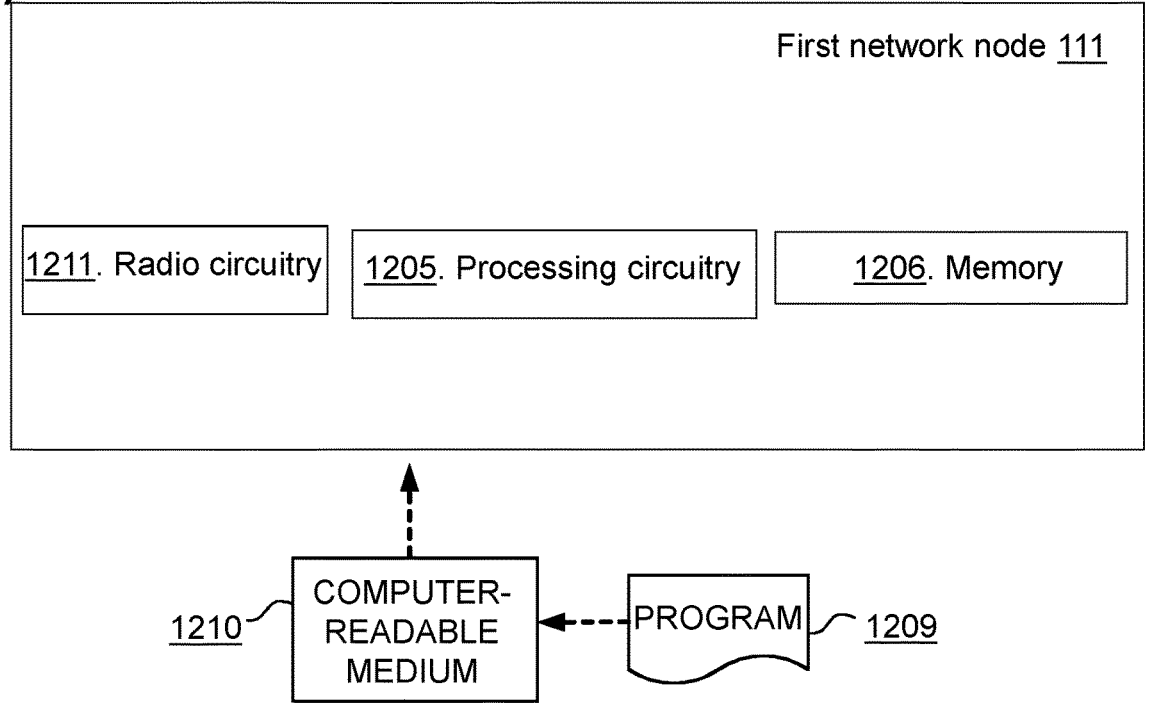

FIG. 12 depicts two different examples in panels a) and b), respectively, of the arrangement that the first network node 111 may comprise to perform the method actions described above in relation to FIG. 7. In some embodiments, the first network node 111 may comprise the following arrangement depicted in FIG. 12a. The first network node 111 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111, and will thus not be repeated here. For example, the frequency channel raster grid may be 100 kHz. In FIG. 12, optional units are indicated with dashed boxes.

The first network node 111 is configured to perform the initiating sending of Action 702, e.g. by means of an initiating sending unit 1201 within the first network node 111, configured to initiate sending the first indication to the first wireless device 131 configured to operate in the wireless communications network 100 using NB-IoT. The first indication is further configured to indicate that the first carrier 141, the first carrier 141 being configured to be a standalone NB-IoT carrier operating within the NR carrier is: a) deployed in one of: the guardband mode and the inband mode, and b) shifted away by the frequency offset from the frequency channel raster grid configured to be used by the first wireless device 131. The initiating sending unit 1201 may be the processor 1205 of the first network node 111, or an application running on such processor.

In some embodiments, to initiate sending in 701 may be configured to be performed via one of: a) MIB, b) RRC signaling sent on the NPBCH, and c) SIB.

In some embodiments, the frequency channel raster grid may be configured to be 100 kHz, and the frequency offset may be configured to be ±2.5 kHz or ±7.5 kHz.

In some embodiments, the first network node 111 may be configured to operate in the wireless communications network 100 using NB-IoT.

The first network node 111 may be further configured to perform the configuring of Action 701, e.g. by means of a configuring unit 1202 within the first network node 111, configured to configure the first carrier 141 to operate within the NR carrier. The configuring unit 1201 may be a processor 1205 of the first network node 111, or an application running on such processor.

The first network node 111 may be further configured to perform the initiating sending of Action 703, e.g. by means of the initiating sending unit 1201 within the first communication device 101, configured to initiate sending the second indication to the first wireless device 131. The second indication may be configured to indicate that the first carrier 141 is operating with a different PCI than an assumed LTE carrier, the first carrier 141 being an anchor NB-IoT carrier. The initiating sending unit 1201 may be the processor 1205 of the first network node 1111, or an application running on such processor.

The first network node 111 may be further configured to perform the initiating sending of Action 704, e.g. by means of the initiating sending unit 1201 within the first network node 111, configured to initiate sending the third indication to the first wireless device 131, the third indication being configured to indicate that the second carrier 142 is deployed in the guardband mode or in the inband mode, the second carrier 142 being a non-anchor NB-IoT carrier.

The first network node 111 may be configured to perform the refraining of Action 705, e.g. by means of a refraining unit 1203 within the first network node 111, configured to refrain from sending the fourth indication to the first wireless device 131, the fourth indication being configured to be an information element comprising NB inband carrier information. The refraining unit 1203 may be the processor 1205 of the first network node 111, or an application running on such processor.

Other units 1204 may be comprised in the first network node 111.

The embodiments herein in the first network node 111 may be implemented through one or more processors, such as a processor 1205 in the first network node 111 depicted in FIG. 12a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1206 comprising one or more memory units. The memory 1206 is arranged to be used to store obtained information, store data, configurations, schedulings, and applications etc. to perform the methods herein when being executed in the first network node 111.

In some embodiments, the first network node 111 may receive information from, e.g., the first wireless device 131, through a receiving port 1207. In some embodiments, the receiving port 1207 may be, for example, connected to one or more antennas in first network node 111. In other embodiments, the first network node 111 may receive information from another structure in the wireless communications network 100 through the receiving port 1207. Since the receiving port 1207 may be in communication with the processor 1205, the receiving port 1207 may then send the received information to the processor 1205. The receiving port 1207 may also be configured to receive other information.

The processor 1205 in the first network node 111 may be further configured to transmit or send information to e.g., the first wireless device 131, another structure in the wireless communications network 100, through a sending port 1208, which may be in communication with the processor 1205, and the memory 1206.

Those skilled in the art will also appreciate that the configuring unit 1201, the initiating sending unit 1202, the refraining unit 1203 and the other units 1204 described above may refer to a combination of analog and digital circuits, and/or one or more processors configured with software and/or firmware, e.g., stored in memory, that, when executed by the one or more processors such as the processor 1205, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different circuits 1201-1204 described above may be implemented as one or more applications running on one or more processors such as the processor 1205.

Thus, the methods according to the embodiments described herein for the first network node 111 may be respectively implemented by means of a computer program 1209 product, comprising instructions, i.e., software code portions, which, when executed on at least one processor 1205, cause the at least one processor 1205 to carry out the actions described herein, as performed by the first network node 111. The computer program 1209 product may be stored on a computer-readable storage medium 1210. The computer-readable storage medium 1210, having stored thereon the computer program 1209, may comprise instructions which, when executed on at least one processor 1205, cause the at least one processor 1205 to carry out the actions described herein, as performed by the first network node 111. In some embodiments, the computer-readable storage medium 1210 may be a non-transitory computer-readable storage medium, such as a CD ROM disc, or a memory stick. In other embodiments, the computer program 1209 product may be stored on a carrier containing the computer program 1209 just described, wherein the carrier is one of an electronic signal, optical signal, radio signal, or the computer-readable storage medium 1210, as described above.

The first network node 111 may comprise a communication interface configured to facilitate communications between the first network node 111 and other nodes or devices, e.g., the second communication device 102. The interface may, for example, include a transceiver configured to transmit and receive radio signals over an air interface in accordance with a suitable standard.

In other embodiments, the first network node 111 may comprise the following arrangement depicted in FIG. 12b. The first network node 111 may comprise a processing circuitry 1205, e.g., one or more processors such as the processor 1205, in the first network node 111 and the memory 1206. The first network node 111 may also comprise a radio circuitry 1211, which may comprise e.g., the receiving port 1207 and the sending port 1208. The processing circuitry 1205 may be configured to, or operable to, perform the method actions according to FIG. 7, and/or FIGS. 20-24, in a similar manner as that described in relation to FIG. 12a. The radio circuitry 1211 may be configured to set up and maintain at least a wireless connection with the first wireless device 131. Circuitry may be understood herein as a hardware component.

Hence, embodiments herein also relate to the first network node 111 operative to operate in the wireless communications network 100. The first network node 111 may comprise the processing circuitry 1205 and the memory 1206, said memory 1206 containing instructions executable by said processing circuitry 1205, whereby the first network node 111 is further operative to perform the actions described herein in relation to the first network node 111, e.g., in FIG. 7, and/or FIGS. 20-24.

Figure 13:
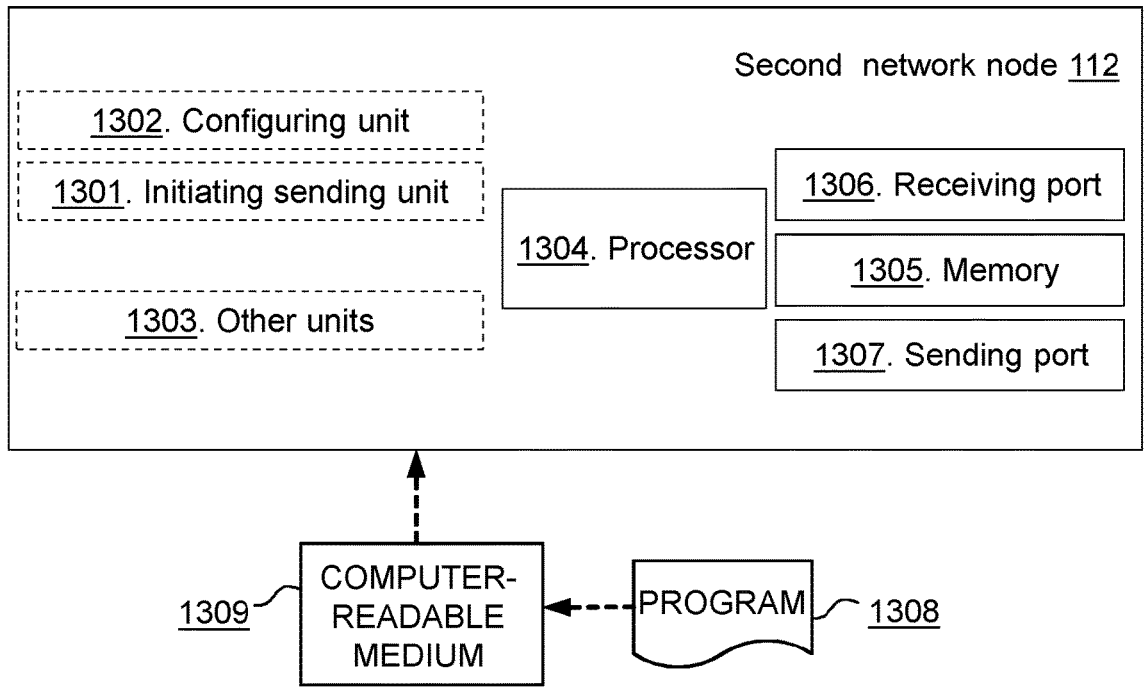
FIG. 13 is a schematic block diagram illustrating two non-limiting examples, a) and b), of a second network node, according to embodiments herein.
Figure 13:
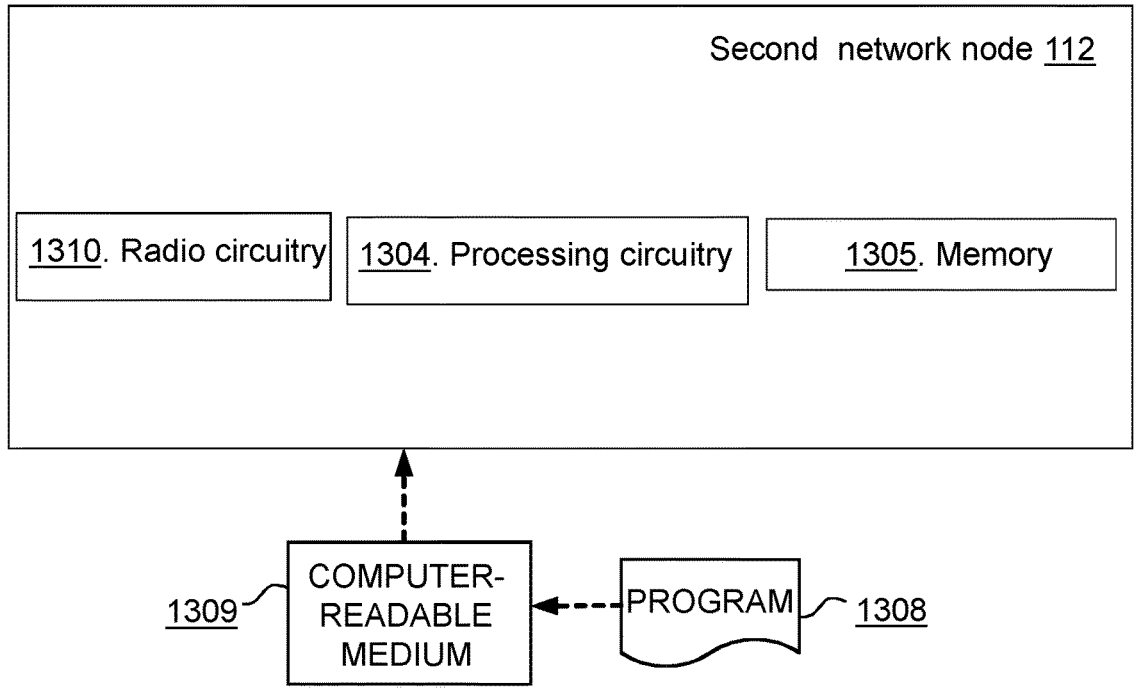

FIG. 13 depicts two different examples in panels a) and b), respectively, of the arrangement that the second network node 112 may comprise to perform the method actions described above in relation to FIG. 8. In some embodiments, the second network node 112 may comprise the following arrangement depicted in FIG. 13a. The second network node 112 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the second network node 112, and will thus not be repeated here. For example, the frequency channel raster grid may be 100 kHz. In FIG. 13, optional units are indicated with dashed boxes.

The second network node 112 is configured to perform the initiating sending of Action 802, e.g. by means of an initiating sending unit 1301 within the second network node 112, configured to initiate sending the fifth indication to the second wireless device 132 configured to operate in the wireless communications network 100. The second wireless device 132 is configured to be served by the second network node 112. The fifth indication is configured to indicate that the set of resources corresponding to the first carrier 141, the first carrier 141 being configured to be a standalone NB-IoT carrier operating within the NR, carrier are reserved. The initiating sending unit 1301 may be the processor 1304 of the second network node 112, or an application running on such processor.

In some embodiments, the set of resources which are configured to be reserved may be further configured to comprise the guard spectrum around the first carrier 141.

In some embodiments, the guard spectrum may be configured to comprise NB-IoT subcarriers on the first subcarrier grid, the first subcarrier grid being configured to be different than the second subcarrier grid of NR.

In some embodiments, the frequency channel raster grid may be configured to be 100 kHz, and the frequency offset may be ±2.5 kHz or ±7.5 kHz.

In some embodiments, the set of resources which are configured to be reserved may be further configured to comprise the predetermined number of symbols, slots, and/or subframes.

In some embodiments, the second network node 112 may be configured to perform the configuring of Action 801, e.g. by means of a configuring unit 1301 within the second network node 112, configured to configure 801 the set of resources as reserved resources, the set of resources being configured to correspond to the first carrier 141. The configuring unit 1301 may be a processor 1304 of the second network node 112, or an application running on such processor.

Other units 1303 may be comprised in the second network node 112.

The embodiments herein in the second network node 112 may be implemented through one or more processors, such as a processor 1304 in the second network node 112 depicted in FIG. 13a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1305 comprising one or more memory units. The memory 1305 is arranged to be used to store obtained information, store data, configurations, schedulings, and applications etc. to perform the methods herein when being executed in the second network node 112.

In some embodiments, the second network node 112 may receive information from, e.g., the second wireless device 132, through a receiving port 1306. In some embodiments, the receiving port 1306 may be, for example, connected to one or more antennas in second network node 112. In other embodiments, the second network node 112 may receive information from another structure in the wireless communications network 100 through the receiving port 1306. Since the receiving port 1306 may be in communication with the processor 1304, the receiving port 1306 may then send the received information to the processor 1304. The receiving port 1306 may also be configured to receive other information.

The processor 1304 in the second network node 112 may be further configured to transmit or send information to e.g., the second wireless device 132, another structure in the wireless communications network 100, through a sending port 1307, which may be in communication with the processor 1304, and the memory 1305.

Those skilled in the art will also appreciate that the configuring unit 1301, the initiating sending unit 1302, and the other units 1303 described above may refer to a combination of analog and digital circuits, and/or one or more processors configured with software and/or firmware, e.g., stored in memory, that, when executed by the one or more processors such as the processor 1304, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1301-1303 described above may be implemented as one or more applications running on one or more processors such as the processor 1304.

Thus, the methods according to the embodiments described herein for the second network node 112 may be respectively implemented by means of a computer program 1308 product, comprising instructions, i.e., software code portions, which, when executed on at least one processor 1304, cause the at least one processor 1304 to carry out the actions described herein, as performed by the second network node 112. The computer program 1308 product may be stored on a computer-readable storage medium 1309. The computer-readable storage medium 1309, having stored thereon the computer program 1308, may comprise instructions which, when executed on at least one processor 1304, cause the at least one processor 1304 to carry out the actions described herein, as performed by the second network node 112. In some embodiments, the computer-readable storage medium 1309 may be a non-transitory computer-readable storage medium, such as a CD ROM disc, or a memory stick. In other embodiments, the computer program 1308 product may be stored on a carrier containing the computer program 1308 just described, wherein the carrier is one of an electronic signal, optical signal, radio signal, or the computer-readable storage medium 1309, as described above.

The second network node 112 may comprise a communication interface configured to facilitate communications between the second network node 112 and other nodes or devices, e.g., the second communication device 102. The interface may, for example, include a transceiver configured to transmit and receive radio signals over an air interface in accordance with a suitable standard.

In other embodiments, the second network node 112 may comprise the following arrangement depicted in FIG. 13b. The second network node 112 may comprise a processing circuitry 1304, e.g., one or more processors such as the processor 1304, in the second network node 112 and the memory 1305. The second network node 112 may also comprise a radio circuitry 1310, which may comprise e.g., the receiving port 1306 and the sending port 1307. The processing circuitry 1304 may be configured to, or operable to, perform the method actions according to FIG. 8, and/or FIGS. 20-24, in a similar manner as that described in relation to FIG. 13a. The radio circuitry 1310 may be configured to set up and maintain at least a wireless connection with the second wireless device 132. Circuitry may be understood herein as a hardware component.

Hence, embodiments herein also relate to the second network node 112 operative to operate in the wireless communications network 100. The second network node 112 may comprise the processing circuitry 1304 and the memory 1305, said memory 1305 containing instructions executable by said processing circuitry 1304, whereby the second network node 112 is further operative to perform the actions described herein in relation to the second network node 112, e.g., in FIG. 8, and/or FIGS. 20-24.

Hence, embodiments herein also relate to the second network node 112 operative to operate in the wireless communications network 100. The second network node 112 may comprise the processing circuitry 1304 and the memory 1305, said memory 1305 containing instructions executable by said processing circuitry 1304, whereby the second network node 112 is further operative to perform the actions described herein in relation to the second communication device 102, e.g., in FIGS. 8, and/or 20-24.

Figure 14:
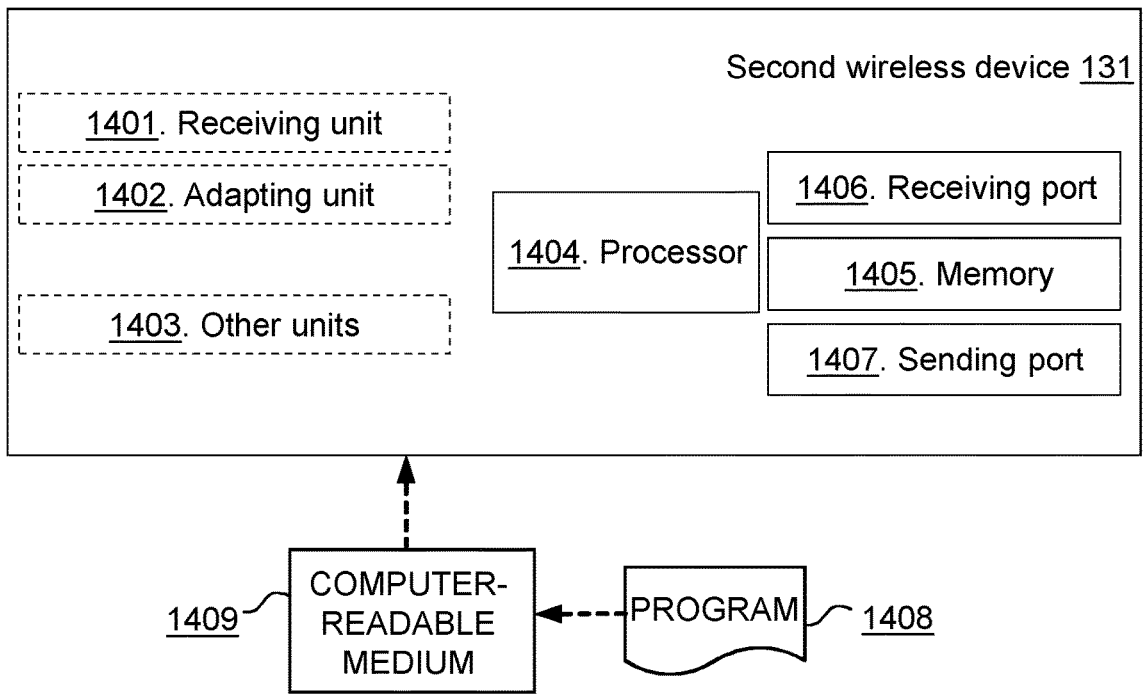
FIG. 14 is a schematic block diagram illustrating two non-limiting examples, a) and b), of a second wireless device, according to embodiments herein.
Figure 14:
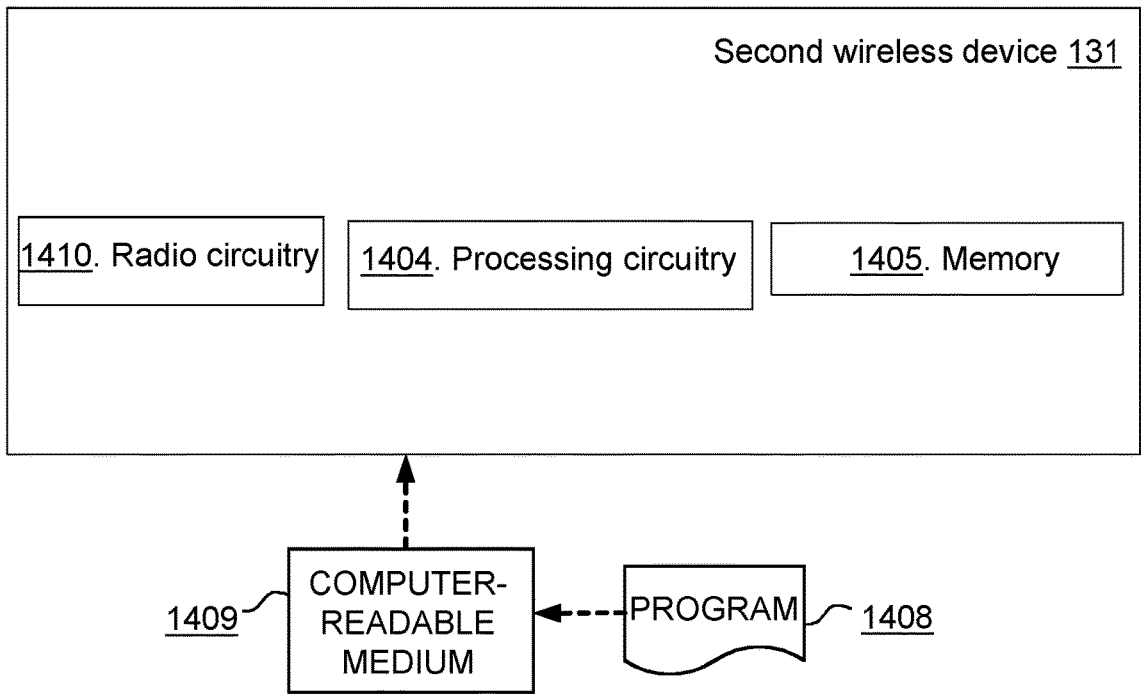

FIG. 14 depicts two different examples in panels a) and b), respectively, of the arrangement that the second wireless device 132 may comprise to perform the method actions described above in relation to FIG. 9. In some embodiments, the second wireless device 132 may comprise the following arrangement depicted in FIG. 14a. The second wireless device 132 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111, and will thus not be repeated here. For example, the frequency channel raster grid may be 100 kHz. In FIG. 12, optional units are indicated with dashed boxes.

The second wireless device 132 is configured to perform the receiving of Action 901, e.g. by means of a receiving unit 1401 within the second wireless device 132, configured to receive the fifth indication from the second network node 112 configured to operate in the wireless communications network 100. The second wireless device 132 is configured to be served by the second network node 112. The fifth indication is configured to indicate that the set of resources corresponding to the first carrier 141, the first carrier 141 being configured to be a standalone NB-IoT carrier operating within the NR carrier, are reserved. The receiving unit 1401 may be a processor 1404 of the second wireless device 132, or an application running on such processor.

The second wireless device 132 is configured to perform the rate matching of Action 902, e.g. by means of an adapting unit 1402 within the second wireless device 132, configured to rate match based on the fifth indication configured to be received. The adapting unit 1402 may be the processor 1404 of the second wireless device 132, or an application running on such processor.

In some embodiments, the set of resources which are configured to be reserved may be further configured to comprise the guard spectrum around the first carrier 141.

In some embodiments, the guard spectrum may be configured to comprise NB-IoT subcarriers on the first subcarrier grid, the first subcarrier grid being different than the second subcarrier grid of NR.

In some embodiments, the set of resources which are configured to be reserved may be further configured to comprise a predetermined number of symbols, slots, and/or subframes.

Other units 1403 may be comprised in the second wireless device 132.

In FIG. 14, optional units are indicated with dashed boxes.

The embodiments herein in the second wireless device 132 may be implemented through one or more processors, such as a processor 1404 in the second wireless device 132 depicted in FIG. 14a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second wireless device 132. One such carrier may be in the form of a CD ROM disc. It is however feasible with other data carriers such as a memory stick. The computer program code may furthermore be provided as pure program code on a server and downloaded to the second wireless device 132.

The second wireless device 132 may further comprise a memory 1405 comprising one or more memory units. The memory 1405 is arranged to be used to store obtained information, store data, configurations, schedulings, and applications etc. to perform the methods herein when being executed in the second wireless device 132.

In some embodiments, the second wireless device 132 may receive information from, e.g., the second network node 112, through a receiving port 1406. In some embodiments, the receiving port 1406 may be, for example, connected to one or more antennas in second wireless device 132. In other embodiments, the second wireless device 132 may receive information from another structure in the wireless communications network 100 through the receiving port 1406. Since the receiving port 1406 may be in communication with the processor 1404, the receiving port 1406 may then send the received information to the processor 1404. The receiving port 1406 may also be configured to receive other information.

The processor 1404 in the second wireless device 132 may be further configured to transmit or send information to e.g., the second network node 112, another structure in the wireless communications network 100, through a sending port 1407, which may be in communication with the processor 1404, and the memory 1405.

Those skilled in the art will also appreciate that the receiving unit 1401, the adapting unit 1402 and the other units 1403 described above may refer to a combination of analog and digital circuits, and/or one or more processors configured with software and/or firmware, e.g., stored in memory, that, when executed by the one or more processors such as the processor 1404, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1401-1403 described above may be implemented as one or more applications running on one or more processors such as the processor 1404.

Thus, the methods according to the embodiments described herein for second wireless device 132 may be respectively implemented by means of a computer program 1408 product, comprising instructions, i.e., software code portions, which, when executed on at least one processor 1404, cause the at least one processor 1404 to carry out the actions described herein, as performed by the second wireless device 132. The computer program 1408 product may be stored on a computer-readable storage medium 1409. The computer-readable storage medium 1409, having stored thereon the computer program 1408, may comprise instructions which, when executed on at least one processor 1404, cause the at least one processor 1404 to carry out the actions described herein, as performed by the second wireless device 132. In some embodiments, the computer-readable storage medium 1409 may be a non-transitory computer-readable storage medium, such as a CD ROM disc, or a memory stick. In other embodiments, the computer program 1408 product may be stored on a carrier containing the computer program 1408 just described, wherein the carrier is one of an electronic signal, optical signal, radio signal, or the computer-readable storage medium 1409, as described above.

The second wireless device 132 may comprise a communication interface configured to facilitate communications between the second wireless device 132 and other nodes or devices, e.g., the second communication device 102. The interface may, for example, include a transceiver configured to transmit and receive radio signals over an air interface in accordance with a suitable standard.

In other embodiments, the second wireless device 132 may comprise the following arrangement depicted in FIG. 14b. The second wireless device 132 may comprise a processing circuitry 1404, e.g., one or more processors such as the processor 1404, in the second wireless device 132 and the memory 1405. The second wireless device 132 may also comprise a radio circuitry 1410, which may comprise e.g., the receiving port 1406 and the sending port 1407. The processing circuitry 1404 may be configured to, or operable to, perform the method actions according to FIG. 9, and/or FIGS. 20-24, in a similar manner as that described in relation to FIG. 14a. The radio circuitry 1410 may be configured to set up and maintain at least a wireless connection with the second wireless device 132. Circuitry may be understood herein as a hardware component.

Hence, embodiments herein also relate to the second wireless device 132 operative to operate in the wireless communications network 100. The second wireless device 132 may comprise the processing circuitry 1404 and the memory 1405, said memory 1405 containing instructions executable by said processing circuitry 1404, whereby the second wireless device 132 is further operative to perform the actions described herein in relation to the second wireless device 132, e.g., in FIG. 9, and/or FIGS. 20-24.

Examples Related to Embodiments Herein

Examples related to embodiments herein may be as follows.

A first example is a method, performed by the first network node 111 which comprises the following actions. The first network node 111 operates in the wireless communications network 100.

Figure 15:
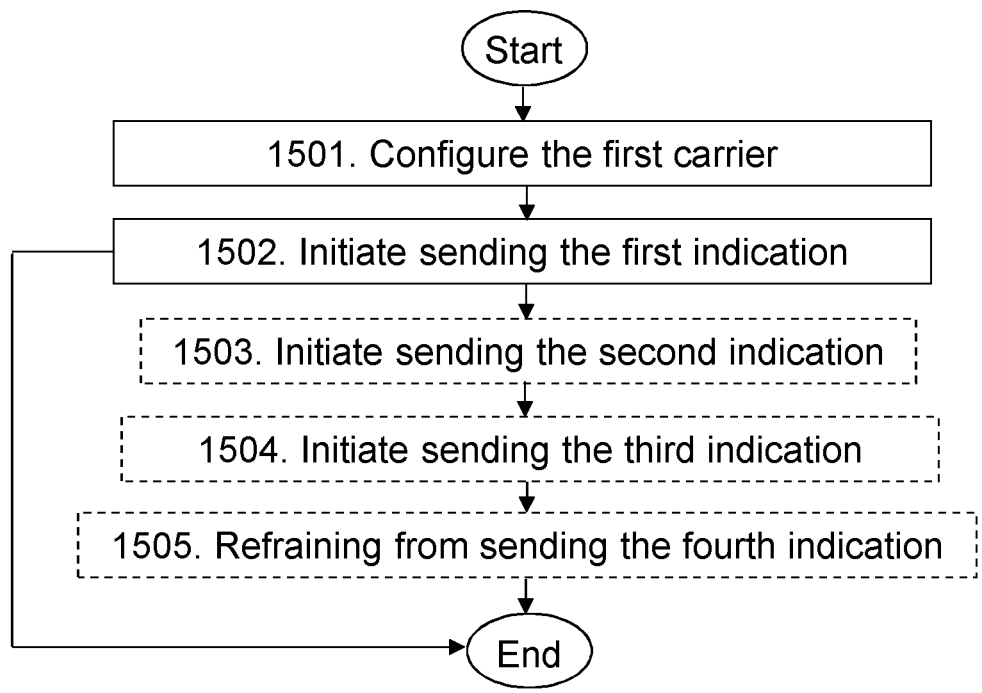
FIG. 15 is a flowchart depicting a method in the first network node, related to embodiments herein.

In some embodiments all the actions may be performed. In some embodiments, one or more actions may be performed. One or more embodiments may be combined, where applicable. All possible combinations are not described to simplify the description. In FIG. 15, optional actions are indicated with dashed lines. Some actions may be performed in a different order than that shown in FIG. 15.

Configuring 1501 the first carrier 141, the first carrier 141 being a Narrow Band-Internet of Things (NB-IoT), carrier operating on standalone mode, to operate within an NR carrier, e.g., the third carrier 143. The first network node 111 may be configured to perform this configuring 1501 action, e.g. by means of a configuring unit 1201 within the first network node 111, configured to perform this action. The configuring unit 1201 may be a processor 1205 of the first network node 111, or an application running on such processor.

Initiating sending 1502 a first indication to the first wireless device 131 operating in the wireless communications network 100 using NB-IoT, the first wireless device 131 being served by the first network node 111, the first indication indicating that the first carrier 141 is:
a) operating in one of: a guardband mode and an inband mode, and
b) shifted away by a frequency offset from a frequency channel raster grid used by the first wireless device 131. The first network node 111 may be configured to perform this initiating sending action 1502, e.g. by means of an initiating sending unit 1202 within the first network node 111, configured to perform this action.

The initiating sending may be understood herein as triggering, starting, or enabling the sending or transmitting.

The initiating sending 701 may be performed via one of: a) Master Information Block (MIB) and b) Radio Resource Control (RRC), signaling sent on a NarrowBand Physical Broadcast Channel (NPBCH).

The frequency channel raster grid may be 100 kHz, and the frequency offset may be ±2.5 kHz or ±7.5 kHz.

The frequency channel raster grid may be understood to be used by the first wireless device 131 to search for anchor NB-IoT channels.

In some embodiments, the method may further comprise one or more of the following actions:

Initiating sending 1503 a second indication to the first wireless device 131, the second indication indicating that the first carrier 141 is operating with a different Physical Cell Identifier (PCI) than an LTE carrier, the first carrier 141 being an anchor NB-IoT carrier. The first network node 111 may be configured to perform this initiating sending 1503 action, e.g. by means of the initiating sending unit 1202 within the first communication device 101, configured to perform this action.

Initiating sending 1504 a third indication to the first wireless device 131, the third indication indicating that a second carrier 142 is operating in a guardband mode or in an inband mode, the second carrier 142 being a non-anchor NB IoT carrier. The first network node 111 may be configured to perform this initiating sending action 1504, e.g. by means of the initiating sending unit 1202 within the first network node 111, configured to perform this action.

Refraining 1505 from sending a fourth indication to the first wireless device 131, the fourth indication being an information element comprising NB inband carrier information, e.g., the SIB22-NB inbandCarrierInfo-r14 IE. The first network node 111 may be configured to perform this refraining action 1505, e.g. by means of a refraining unit 1203 within the first network node 111, configured to perform this action.

A second example is a method, performed by the second network node 112 comprises the following actions. The second network node 112 operates in the wireless communications network 100, e.g., using New Radio, NR.

Figure 16:
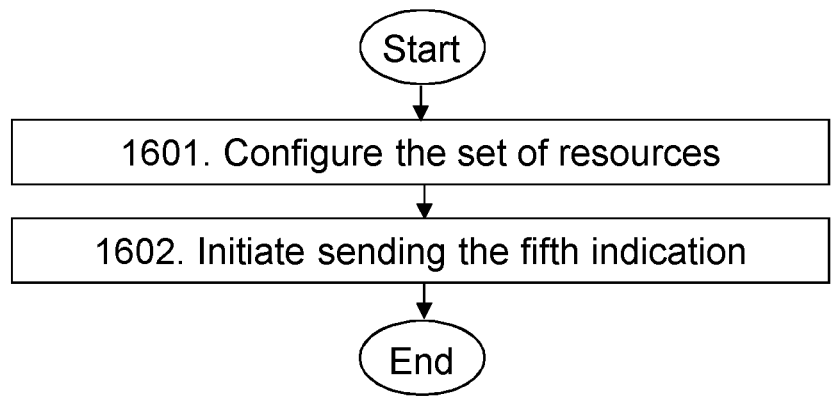
FIG. 16 is a flowchart depicting a method in the second network node, related to embodiments herein.

In some embodiments all the actions may be performed. In some embodiments, one or more actions may be performed. One or more embodiments may be combined, where applicable. All possible combinations are not described to simplify the description. In FIG. 16, optional actions are indicated with dashed lines. Some actions may be performed in a different order than that shown in FIG. 16.

Configuring 1601 a set of resources as reserved resources, the set of resources corresponding to the first carrier 141, the first carrier 141 being a NB-IoT carrier operating on standalone mode. The second network node 112 may be configured to perform this configuring 1601 action, e.g. by means of a configuring unit 1301 within the second network node 112, configured to perform this action.

The set of resources may be understood to be radio resources.

Corresponding to the first carrier 141 may be understood to mean comprising the frequency range used by the first carrier 141.

Initiating sending 1602 a fifth indication to the second wireless device 132 operating in the wireless communications network 100, the second wireless device 132 being served by the second network node 112, the fifth indication indicating that the set of resources are reserved. The second network node 112 may be configured to perform this initiating sending action 1602, e.g. by means of an initiating sending unit 1302 within the second network node 112, configured to perform this action.

The initiating sending may be understood herein as triggering, starting, or enabling the sending or transmitting.

The set of resources which are reserved may further comprise a guard spectrum around the first carrier 141.

The guard spectrum may comprise NB-IoT subcarriers on a first subcarrier grid, the first subcarrier grid being different than a second subcarrier grid of NR.

A difference between the first subcarrier grid and the second subcarrier grid may be +/−2.7 kHz or +/−7.5 kHz.

A third example is a method, performed by the first wireless device 131 which comprises the following actions. The first wireless device 131 operates in the wireless communications network 100 using NB-IoT.

Figure 17:
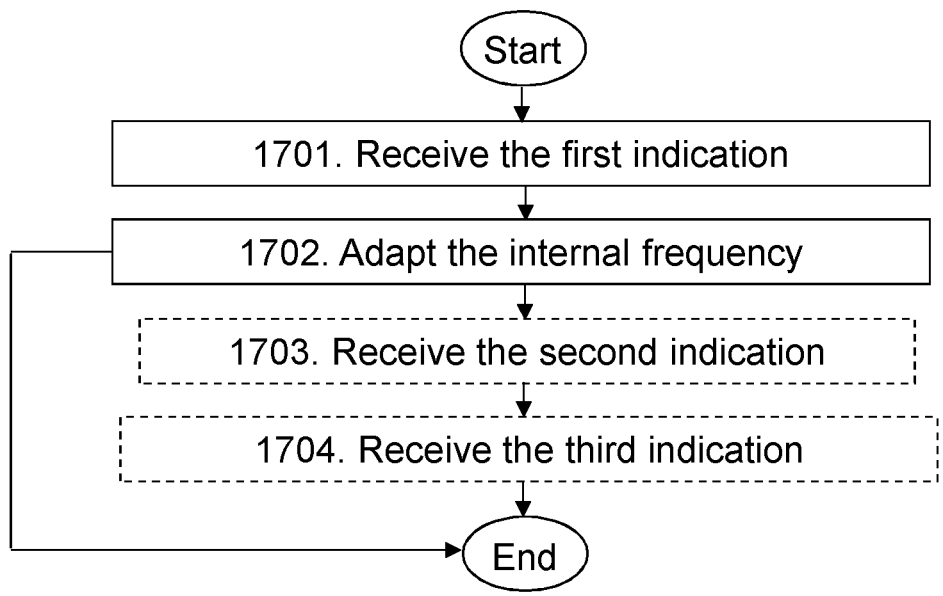
FIG. 17 is a flowchart depicting a method in the first wireless device, related to embodiments herein.

In some embodiments all the actions may be performed. In some embodiments, one or more actions may be performed. One or more embodiments may be combined, where applicable. All possible combinations are not described to simplify the description. In FIG. 17, optional actions are indicated with dashed lines. Some actions may be performed in a different order than that shown in FIG. 17.

Receiving 1701 the first indication from the first network node 111 operating in the wireless communications network 100, the first wireless device 131 being served by the first network node 111, the first indication indicating that the first carrier 141, the first carrier 141 being a NB-IoT carrier operating on standalone mode is:
a) operating in one of: a guardband mode and an inband mode, and
b) shifted away by the frequency offset from the frequency channel raster grid used by the first wireless device 131. The first wireless device 131 may be configured to perform this receiving 1701 action, e.g. by means of a receiving unit 1801 within the first wireless device 131, configured to perform this action.

Adapting 1702 an internal frequency reference of the first wireless device 131, based on the received first indication. The first wireless device 131 may be configured to perform this adapting action 1702, e.g. by means of an adapting unit 1802 within the first wireless device 131, configured to perform this action.

The receiving 1701 may be performed via one of: a) Master Information Block (MIB) and b) Radio Resource Control (RRC), signalling received on the NarrowBand Physical Broadcast Channel (NPBCH).

The frequency channel raster grid may be 100 kHz, and the frequency offset may be ±2.5 kHz or ±7.5 kHz.

The frequency channel raster grid may be understood to be used by the first wireless device 131 to search for anchor NB-IoT channels.

The first network node 111 may be understood to, in some examples, operate in the wireless communications network 100 using Long Term Evolution (LTE).

In some embodiments, the method may further comprise one or more of the following actions:

Receiving 1703 the second indication from the first network node 111, the second indication indicating that the first carrier is operating with a different Physical Cell Identifier (PCI) than an LTE carrier, the first carrier 141 being an anchor NB-IoT carrier. The first wireless device 131 may be configured to perform this receiving 1703 action, e.g. by means of the receiving unit 1801 within the first communication device 101, configured to perform this action. The receiving unit 1801 may be the processor 1804 of the first wireless device 131, or an application running on such processor.

Receiving 1704 the third indication from the first network node 111, the third indication indicating that the second carrier 142 is operating in a guardband mode or in an inband mode, the second carrier 142 being a non-anchor NB IoT carrier. The first wireless device 131 may be configured to perform this receiving 1704 action, e.g. by means of the receiving unit 1801 within the first communication device 101, configured to perform this action. The receiving unit 1801 may be the processor 1804 of the first wireless device 131, or an application running on such processor.

In some examples, the adapting 1702 may comprise adapting one or more operations, or one or more parameters based on the received at least one of the second indication, and the third indication. In some examples, the adapting 1702 may comprise adapting one or more operations, or one or more parameters based on not receiving the fourth indication, e.g., within a certain time period.

Figure 18:
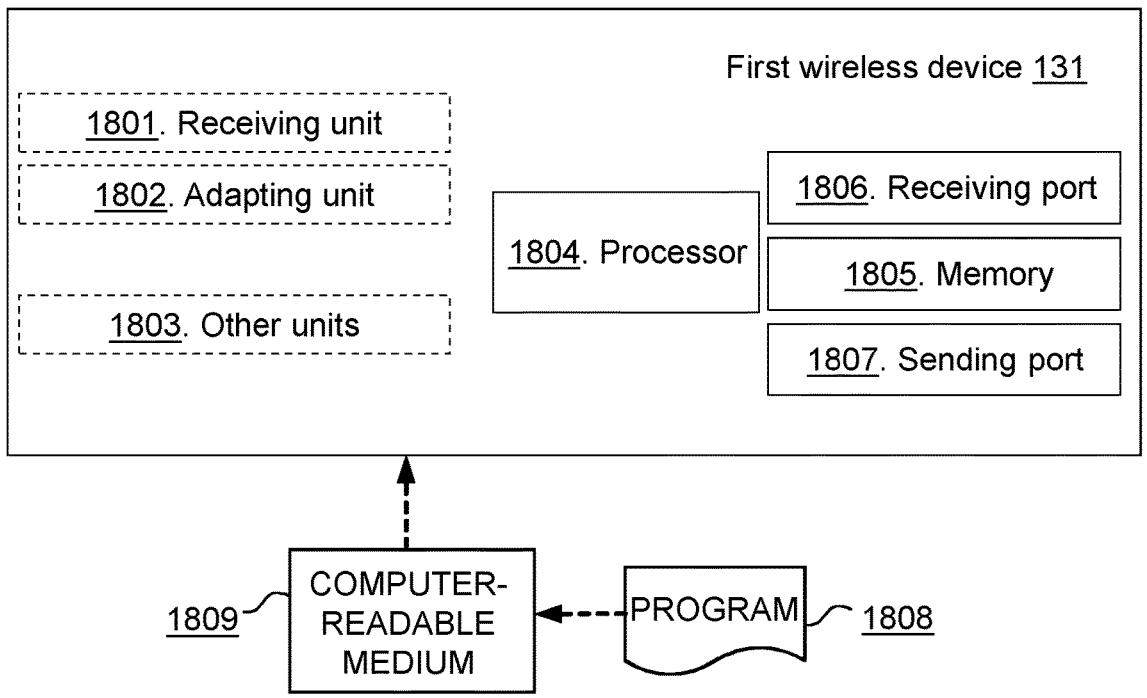
FIG. 18 is a schematic block diagram illustrating two non-limiting examples, a) and b), of a first wireless device, according to embodiments herein.
Figure 18:
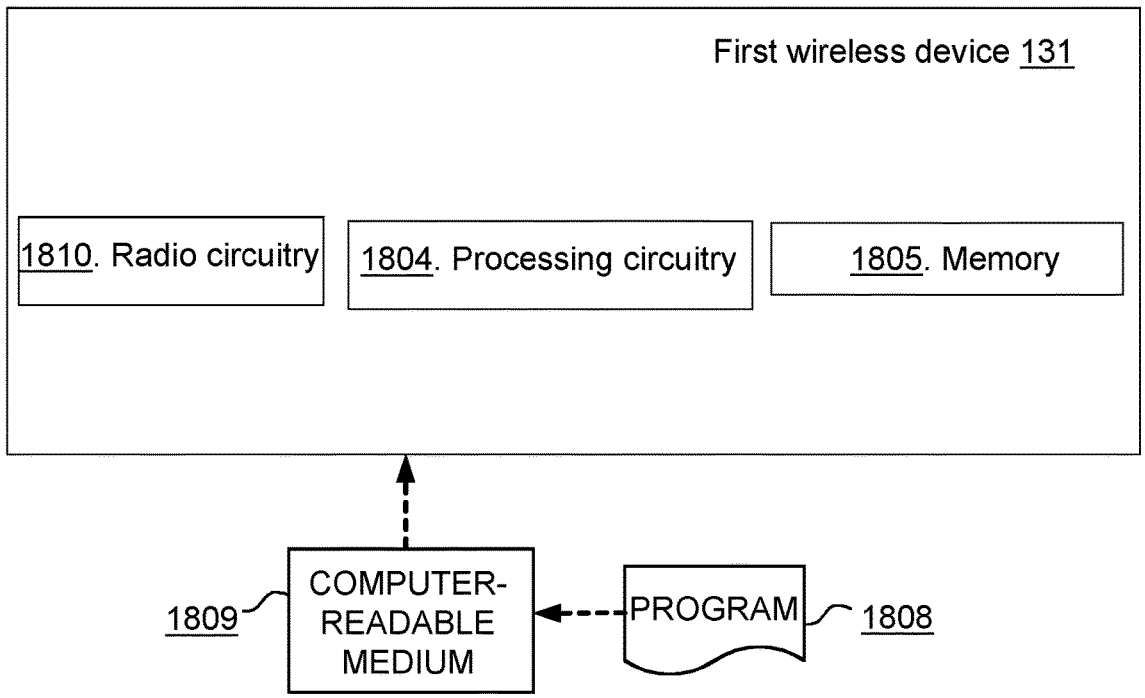

In FIG. 18, optional units are indicated with dashed boxes.

FIG. 18 depicts two different examples in panels a) and b), respectively, of the arrangement that the first wireless device 131 may comprise. In some embodiments, the first wireless device 131 may comprise the following arrangement depicted in FIG. 18a.

The first wireless device 131 may be configured to perform this receiving 1701 action, e.g. by means of a receiving unit 1801 within the first wireless device 131, configured to perform this action. The receiving unit 1801 may be a processor 1804 of the first wireless device 131, or an application running on such processor.

The first wireless device 131 may be configured to perform this adapting action 1702, e.g. by means of an adapting unit 1802 within the first wireless device 131, configured to perform this action. The adapting unit 1802 may be the processor 1804 of the first wireless device 131, or an application running on such processor.

The first network node 111 may be understood to operate in the wireless communications network 100 using Long Term Evolution (LTE).

In some embodiments, the method may further comprise one or more of the following actions:

The first wireless device 131 may be configured to perform this receiving 1703 action, e.g. by means of the receiving unit 1801 within the first communication device 101, configured to perform this action. The receiving unit 1801 may be the processor 1804 of the first wireless device 131, or an application running on such processor.

The first wireless device 131 may be configured to perform this receiving 1704 action, e.g. by means of the receiving unit 1801 within the first communication device 101, configured to perform this action. The receiving unit 1801 may be the processor 1804 of the first wireless device 131, or an application running on such processor.

Other units 1803 may be comprised in the first wireless device 131.

In FIG. 18, optional units are indicated with dashed boxes.

The embodiments herein in the first wireless device 131 may be implemented through one or more processors, such as a processor 1804 in the first wireless device 131 depicted in FIG. 18a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first wireless device 131. One such carrier may be in the form of a CD ROM disc. It is however feasible with other data carriers such as a memory stick. The computer program code may furthermore be provided as pure program code on a server and downloaded to the first wireless device 131.

The first wireless device 131 may further comprise a memory 1805 comprising one or more memory units. The memory 1805 is arranged to be used to store obtained information, store data, configurations, schedulings, and applications etc. to perform the methods herein when being executed in the first wireless device 131.

In some embodiments, the first wireless device 131 may receive information from, e.g., the first network node 111, through a receiving port 1806. In some embodiments, the receiving port 1806 may be, for example, connected to one or more antennas in first wireless device 131. In other embodiments, the first wireless device 131 may receive information from another structure in the wireless communications network 100 through the receiving port 1806. Since the receiving port 1806 may be in communication with the processor 1804, the receiving port 1806 may then send the received information to the processor 1804. The receiving port 1806 may also be configured to receive other information.

The processor 1804 in the first wireless device 131 may be further configured to transmit or send information to e.g., the first network node 111, another structure in the wireless communications network 100, through a sending port 1807, which may be in communication with the processor 1804, and the memory 1805.

Those skilled in the art will also appreciate that the receiving unit 1801, the adapting unit 1802 and the other units 1803 described above may refer to a combination of analog and digital circuits, and/or one or more processors configured with software and/or firmware, e.g., stored in memory, that, when executed by the one or more processors such as the processor 1804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1801-1803 described above may be implemented as one or more applications running on one or more processors such as the processor 1804.

Thus, the methods according to the embodiments described herein for the first wireless device 131 may be respectively implemented by means of a computer program 1808 product, comprising instructions, i.e., software code portions, which, when executed on at least one processor 1804, cause the at least one processor 1804 to carry out the actions described herein, as performed by the first wireless device 131. The computer program 1808 product may be stored on a computer-readable storage medium 1809. The computer-readable storage medium 1809, having stored thereon the computer program 1808, may comprise instructions which, when executed on at least one processor 1804, cause the at least one processor 1804 to carry out the actions described herein, as performed by the first wireless device 131. In some embodiments, the computer-readable storage medium 1809 may be a non-transitory computer-readable storage medium, such as a CD ROM disc, or a memory stick. In other embodiments, the computer program 1808 product may be stored on a carrier containing the computer program 1808 just described, wherein the carrier is one of an electronic signal, optical signal, radio signal, or the computer-readable storage medium 1809, as described above.

The first wireless device 131 may comprise a communication interface configured to facilitate communications between the first wireless device 131 and other nodes or devices, e.g., the second communication device 102. The interface may, for example, include a transceiver configured to transmit and receive radio signals over an air interface in accordance with a suitable standard.

In other embodiments, the first wireless device 131 may comprise the following arrangement depicted in FIG. 18b. The first wireless device 131 may comprise a processing circuitry 1804, e.g., one or more processors such as the processor 1804, in the first wireless device 131 and the memory 1805. The first wireless device 131 may also comprise a radio circuitry 1810, which may comprise e.g., the receiving port 1806 and the sending port 1807. The processing circuitry 1804 may be configured to, or operable to, perform the method actions according to FIG. 17, and/or FIGS. 20-24, in a similar manner as that described in relation to FIG. 18a. The radio circuitry 1810 may be configured to set up and maintain at least a wireless connection with the second wireless device 132. Circuitry may be understood herein as a hardware component.

Hence, embodiments herein also relate to the first wireless device 131 operative to operate in the wireless communications network 100. The first wireless device 131 may comprise the processing circuitry 1804 and the memory 1805, said memory 1805 containing instructions executable by said processing circuitry 1804, whereby the first wireless device 131 is further operative to perform the actions described herein in relation to the first wireless device 131, e.g., in FIG. 17, and/or FIGS. 20-24.

Further Extensions and Variations

Figure 19:
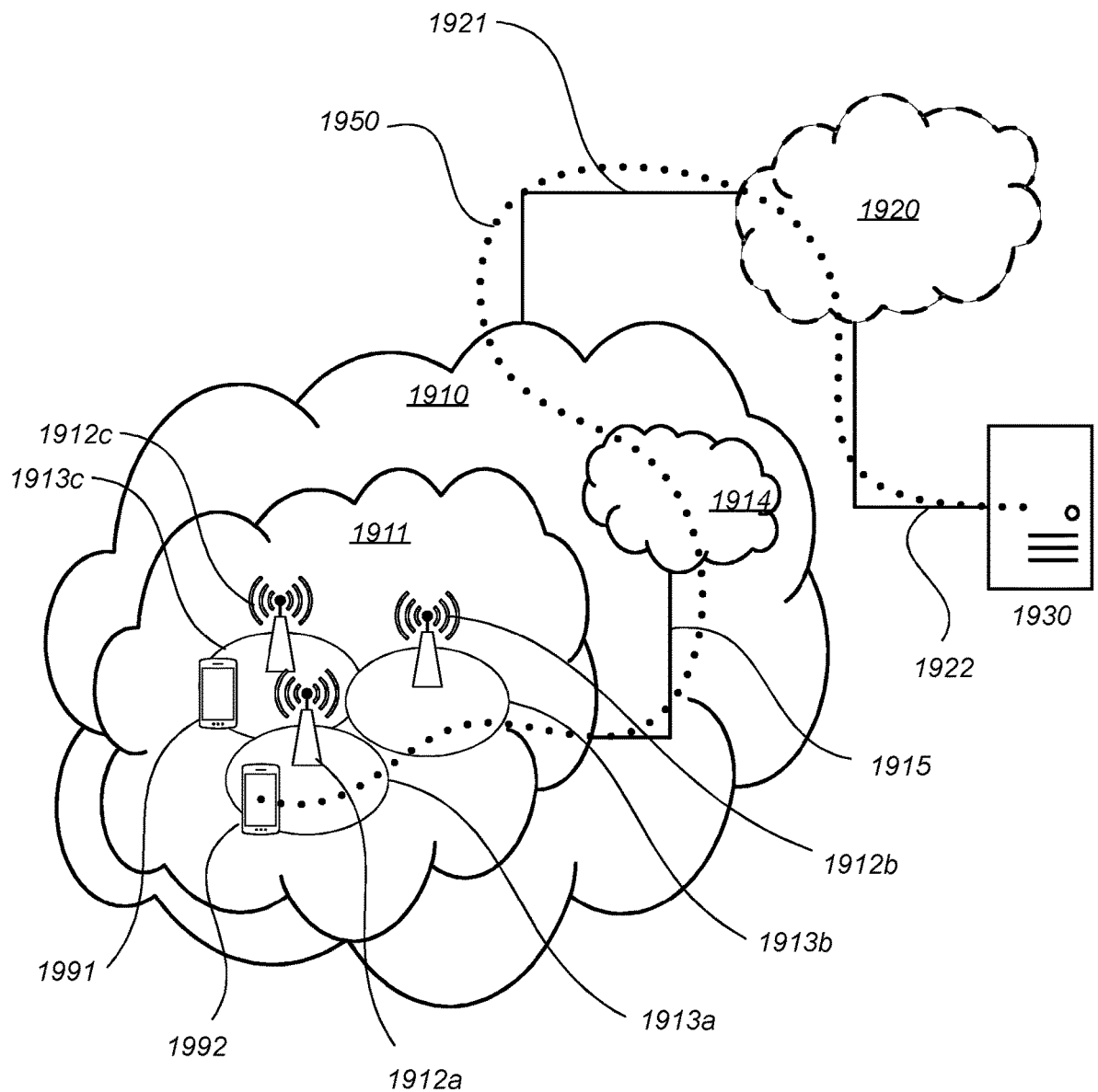
FIG. 19 is a schematic block diagram illustrating a telecommunication network connected via an intermediate network to a host computer, according to embodiments herein.

FIG. 19: Telecommunication Network Connected Via an Intermediate Network to a Host Computer in Accordance with Some Embodiments With reference to FIG. 19, in accordance with an embodiment, a communication system includes telecommunication network 1910 such as the wireless communications network 100, for example, a 3GPP-type cellular network, which comprises access network 1911, such as a radio access network, and core network 1914. Access network 1911 comprises a plurality of network nodes such as the first network node 111 and the second network node 112. For example, base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A plurality of wireless devices, such as the first wireless device 131 and the second wireless device 132 are comprised in the wireless communications network 100. In FIG. 19, a first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912. Any of the UEs 1991, 1992 may be considered examples of the first wireless device 131 or the second wireless device 132.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

In relation to FIGS. 20, 21, 22, 23, and 24, which are described next, it may be understood that a UE is an example of any of the first wireless device 131 and the second wireless device 132, and that any description provided for the UE equally applies to any of the first wireless device 131 and the second wireless device 132. It may be also understood that the base station may be considered an example of any of the first network node 111 and the second network node 112, and that any description provided for the base station equally applies to the first network node 111 and the second network node 112. Similarly, in relation to FIGS. 20, 21, 22, 23, and 24, which are described next, it may be understood that a UE is an example of any of the first wireless device 131 and the second wireless device 132, and that any description provided for the UE equally applies to any of the first wireless device 131 and the second wireless device 132. It may be also understood that the base station may be considered an example any of the first network node 111 and the second network node 112, and that any description provided for the base station equally applies to the first network node 111 and the second network node 112.

Figure 20:
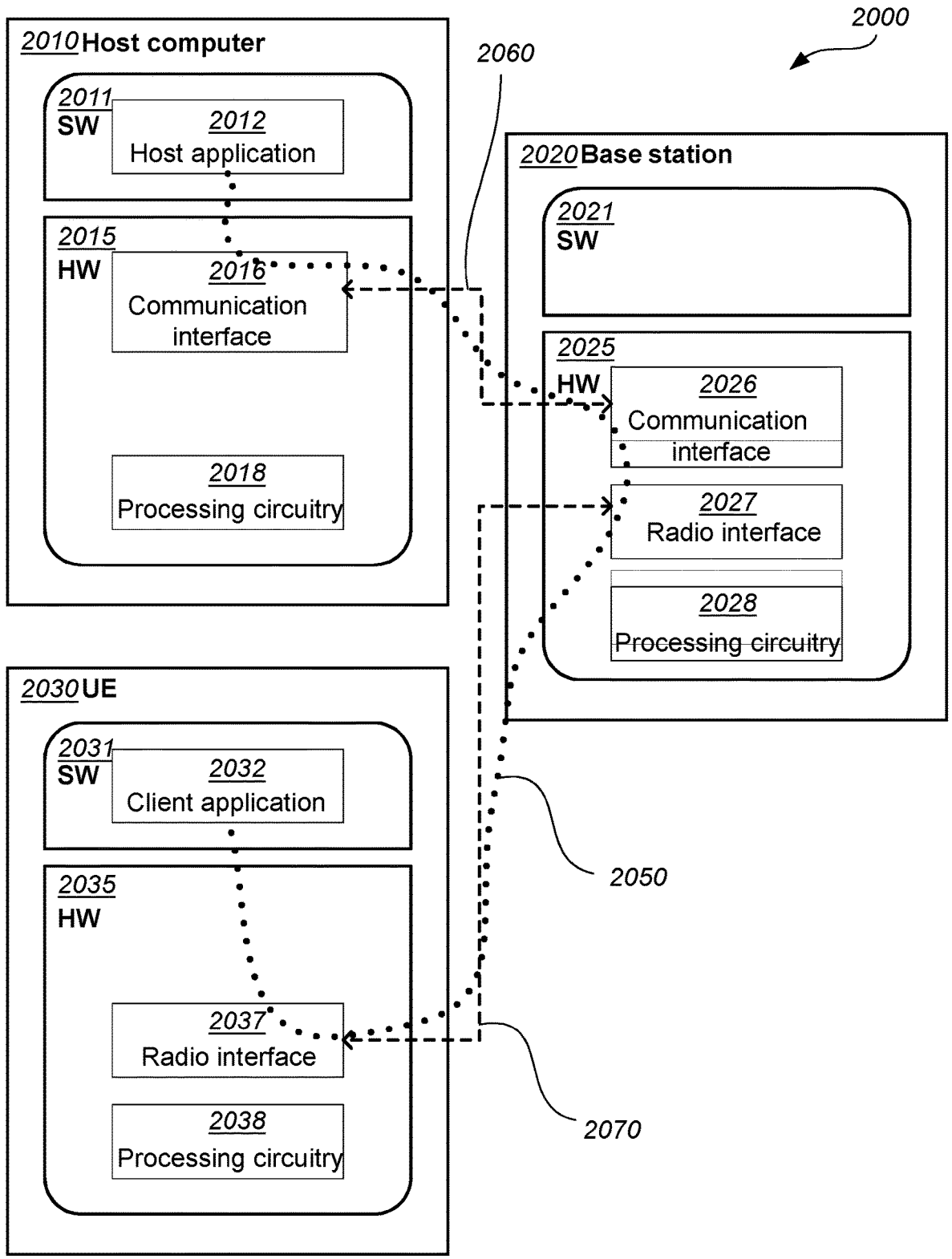
FIG. 20 is a generalized block diagram of a host computer communicating via a base station with a user equipment over a partially wireless connection, according to embodiments herein.

FIG. 20: Host Computer Communicating Via a Base Station with a User Equipment Over a Partially Wireless Connection in Accordance with Some Embodiments Example implementations, in accordance with an embodiment, of any of the first wireless device 131 and the second wireless device 132, e.g., a UE, any of the the first network node 111 and the second network node 112, e.g., a base station and host computer discussed in the preceding paragraphs will now be described with reference to FIG. 20. In communication system 2000, such as the wireless communications network 100, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes the first network node 111 and/or the second network node 112, exemplified in FIG. 20 as a base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with any of the first wireless device 131 and the second wireless device 132, exemplified in FIG. 20 as a UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912a, 1912b, 1912c and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the co-existence of NB-IoT and NR in the wireless communications network 100, spectrum efficiency, interference, and latency, and thereby provide benefits such as reduced decoding errors, user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

The first network node 111 may comprise an arrangement as shown in FIG. 12 or in FIG. 20.

The first network node 111 may comprise an interface unit to facilitate communications between the first network node 111 and other nodes or devices, e.g., any of the first wireless device 131 and the second wireless device 132, the host computer 2010, or any of the other nodes. In some particular examples, the interface may, for example, include a transceiver configured to transmit and receive radio signals over an air interface in accordance with a suitable standard.

The first network node 111 may also comprise a client application 2032 or a client application unit, which may be configured to communicate user data with a host application unit in a host computer 2010, e.g., via another link such as 2050.

The second network node 112 may comprise an arrangement as shown in FIG. 13 or in FIG. 20.

The second network node 112 may comprise an interface unit to facilitate communications between the second network node 112 and other nodes or devices, e.g., the second wireless device 132, the host computer 2010, or any of the other nodes. In some particular examples, the interface may, for example, include a transceiver configured to transmit and receive radio signals over an air interface in accordance with a suitable standard.

The second network node 112 may also comprise a client application 2032 or a client application unit, which may be configured to communicate user data with a host application unit in a host computer 2010, e.g., via another link such as 2050.

The second wireless device 132 may comprise an arrangement as shown in FIG. 14 or in FIG. 20.

The first wireless device 131 or the second wireless device 132 may comprise an arrangement as shown in FIG. 18 or in FIG. 20.

The first wireless device 131 or the second wireless device 132 may comprise an interface unit to facilitate communications between any of the first wireless device 131 and the second wireless device 132 and other nodes or devices, e.g., the first network node 111, the host computer 2010, or any of the other nodes. In some particular examples, the interface may, for example, include a transceiver configured to transmit and receive radio signals over an air interface in accordance with a suitable standard.

The first wireless device 131 or the second wireless device 132 may also comprise a client application 2032 or a client application unit, which may be configured to communicate user data with a host application unit in a host computer 2010, e.g., via another link such as 2050.

Figure 21:
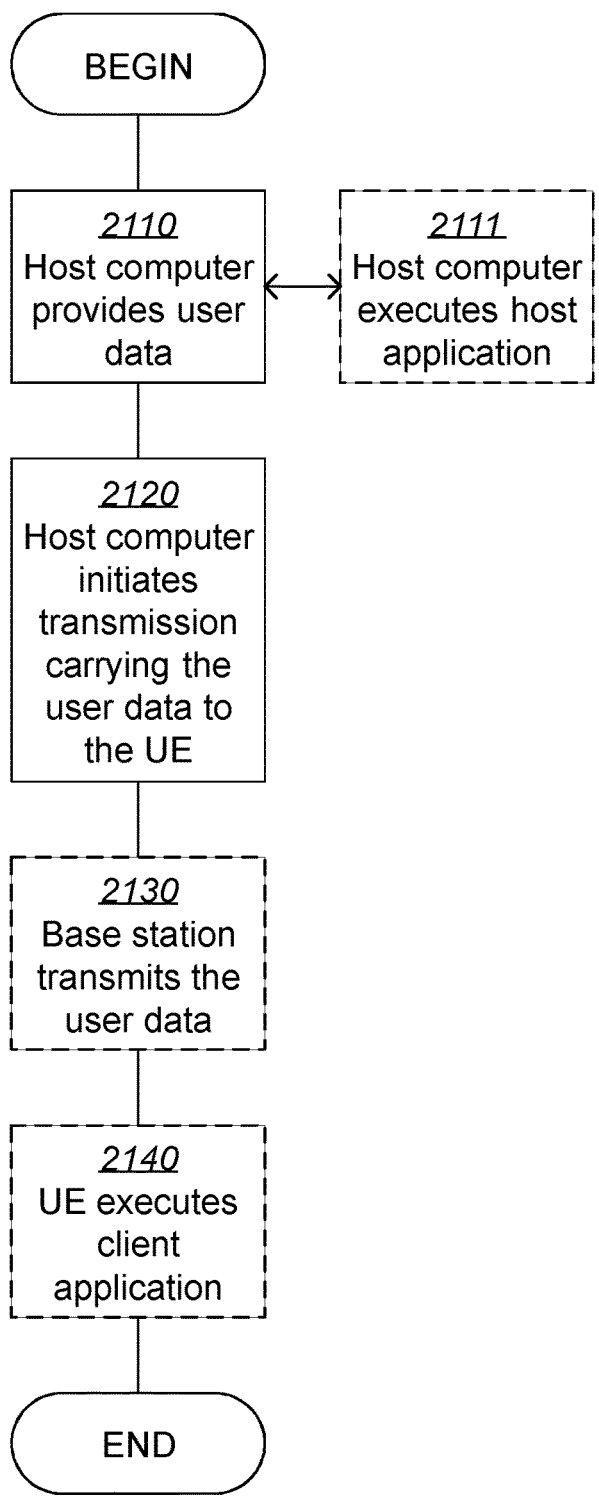
FIG. 21 is a flowchart depicting embodiments of a method in a communications system including a host computer, a base station and a user equipment, according to embodiments herein.

FIG. 21: Methods Implemented in a Communication System Including a Host Computer, a Base Station and a User Equipment in Accordance with Some Embodiments FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
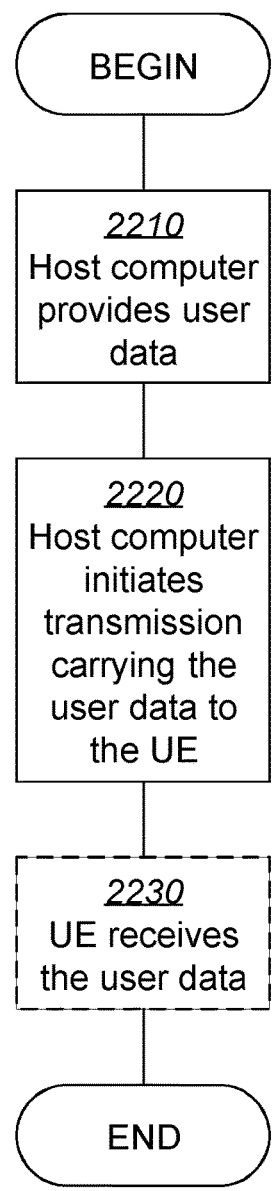
FIG. 22 is a flowchart depicting embodiments of a method in a communications system including a host computer, a base station and a user equipment, according to embodiments herein.

FIG. 22: Methods Implemented in a Communication System Including a Host Computer, a Base Station and a User Equipment in Accordance with Some Embodiments FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

FIG. 23: Methods Implemented in a Communication System Including a Host Computer, a Base Station and a User Equipment in Accordance with Some Embodiments FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

FIG. 24: Methods Implemented in a Communication System Including a Host Computer, a Base Station and a User Equipment in Accordance with Some Embodiments FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

The first network node 111 embodiments relate to FIG. 7, FIG. 12, and FIGS. 20-24.

The second network node 112 embodiments relate to FIG. 8, FIG. 13, and FIGS. 20-24.

The second wireless device 132 embodiments relate to FIG. 9, FIG. 14, and FIGS. 20-24.

The first wireless device 131 embodiments relate to FIG. 9, FIG. 17, and FIGS. 20-24.

Further Numbered Embodiments

1. A base station configured to communicate with a user equipment (UE), the base station comprising a radio interface and processing circuitry configured to perform one or more of the actions described herein as performed by any of the first network node 111 and the second network node 112.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by any of the first network node 111 and the second network node 112.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by any of the first network node 111 and the second network node 112.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by any of the first network node 111 and the second network node 112.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with abase station, the UE comprising a radio interface and processing circuitry configured to perform one or more of the actions described herein as performed by any of the first wireless device 131 and the second wireless device 132.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by any of the first wireless device 131 and the second wireless device 132.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by any of the first wireless device 131 and the second wireless device 132.

35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by any of the first wireless device 131 and the second wireless device 132.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by any of the first wireless device 131 and the second wireless device 132.

45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by any of the first wireless device 131 and the second wireless device 132.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
   the processing circuitry of the host computer is configured to execute a host application; and
   the UE's processing circuitry is configured to execute a client application associated with the host application, thereby providing the user data.

49. The communication system of embodiment 46 or 47, wherein:
   the processing circuitry of the host computer is configured to execute a host application, thereby providing request data; and
   the UE's processing circuitry is configured to execute a client application associated with the host application, thereby providing the user data in response to the request data.

51. A method implemented in a user equipment (UE), comprising one or more of the actions described herein as performed by any of the first wireless device 131 and the second wireless device 132.

52. The method of embodiment 51, further comprising:
   providing user data; and
   forwarding the user data to a host computer via the transmission to the base station.

55. A method implemented in a communication system including a host computer, a base station and a user equipment (UE), the method comprising:
   at the host computer, receiving user data transmitted to the base station from the UE, wherein the UE performs one or more of the actions described herein as performed by any of the first wireless device 131 and the second wireless device 132.

56. The method of embodiment 55, further comprising:
   at the UE, providing the user data to the base station.

57. The method of embodiment 56, further comprising:
   at the UE, executing a client application, thereby providing the user data to be transmitted; and
   at the host computer, executing a host application associated with the client application.

58. The method of embodiment 56, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

61. A base station configured to communicate with a user equipment (UE), the base station comprising a radio interface and processing circuitry configured to perform one or more of the actions described herein as performed by any of the first network node 111 and the second network node 112.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by any of the first network node 111 and the second network node 112.

66. The communication system of embodiment 65, further including the base station.

67. The communication system of embodiment 66, further including the UE, wherein the UE is configured to communicate with the base station.

68. The communication system of embodiment 67, wherein:
   the processing circuitry of the host computer is configured to execute a host application;
   the UE is configured to execute a client application associated with the host application, thereby providing the user data to be received by the host computer.

71. A method implemented in a base station, comprising one or more of the actions described herein as performed by any of the first network node 111 and the second network node 112.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by any of the first wireless device 131 and the second wireless device 132.

76. The method of embodiment 75, further comprising:
at the base station, receiving the user data from the UE.

77. The method of embodiment 76, further comprising:
at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
DL Downlink
eNB E-UTRAN NodeB
E-UTRA Evolved UTRA
E-UTRAN Evolved UTRAN
GERAN GSM EDGE Radio Access Network
gNB Base station in NR
GSM Global System for Mobile communication
HSPA High Speed Packet Access
LTE Long-Term Evolution
OFDM Orthogonal Frequency Division Multiplexing
UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wide Local Area Network
NB Narrow band
NB-IoT Narrowband Internet of Things
MTC Machine Type Communications
PSS Primary Synchronization Sequence
SSS Secondary Synchronization Sequence
SIM Subscriber Identity Module or Subscriber Identification Module
CRC Cyclic Redundancy Check
NB-PSS NB-IoT Primary Synchronization Sequence
NB-SSS NB-IoT Secondary Synchronization Sequence
LTE Long Term Evolution
DFT Discrete Fourier Transform
IFFT Inverse fast fourier transform
CRS Cell Specific Reference Signals
PDCCH Physical Data Control Channel
CP Cyclic prefix
FDD Frequency-division duplex
TDD Time-division duplex
NB-PBCH NB-IoT Physical Broadcast Channel
SNR signal to noise ratios
OFDM Orthogonal frequency-division multiplexing
ZC Zadoff-Chu
CSS common search space
USS UE-specific search space
PRB Physical Resource Block
DL Downlink
UL Uplink

REFERENCES

[1] R4-77AH-IoT-0118, Reply LS on power boosting in-band and guard-band operation for NB-IoT, 3GPP TSG-RAN4 Meeting #77 NB-IOT AH, Budapest, Hungary, 20-22 Jan. 2016.
[2] R1-160082, NB-IoT Channel Raster, source Ericsson, 3GPP TSG-RAN1 NB-IOT Ad Hoc 18-20 Jan. 2016, Budapest, Hungary
[3] R1-160022, Channel raster design, source Huawei, HiSilicon, 3GPP TSG-RAN1 NB-IOT Ad Hoc 18-20 Jan. 2016, Budapest, Hungary
[4] R1-161830, NB-IoT—Synchronization Channel Evaluations, source Ericsson, 3GPP TSG-RAN WG1 NB-IOT AdHoc #2, France, 22-24 Mar. 2016
[5] R1-161958, NB-PSS evaluation, source Huawei, HiSilicon, 3GPP TSG-RAN WG1 NB-IOT AdHoc #2, France, 22-24 Mar. 2016
[6] RP-152284, "New Work Item: Narrowband IoT (NB-IoT)," sources Huawei and HiSilicon, RAN #70.
[7] R1-1716532, "NR and LTE Coexistence", Ericsson, 3GPP TSG-RAN WG1 NR Ad Hoc #3, Nagoya, Japan, 18-21 Sep. 2017.
[8] R1-161548, "RAN1 agreements for Rel-13 NB-IoT", source WI rapporteur (Ericsson), 3GPP TSG-RAN WG1 Meeting #84, St. Julian's, Malta, Feb. 15-19, 2016.
[9] R1-1718522, "On matching transmissions to available resources", Ericsson, 3GPP TSG-RAN WG1 90bis, Prague, Czech Republic, 9-13 Oct. 2017.

The invention claimed is:
1. A method performed by a first network node operating in a wireless communications network using a Narrow Band-Internet of Things (NB-IoT), the method comprising:
initiating sending a first indication to a first wireless device operating in the wireless communications network using the NB-IoT, the first indication indicating that a first carrier is a standalone NB-IoT carrier operating within a New Radio (NR) carrier, and the first carrier is:
deployed in one of: a guardband mode and an inband mode, and
shifted away by a frequency offset from a frequency channel raster grid used by the first wireless device; and
initiating sending a second indication to the first wireless device, the second indication indicating that the first carrier is operating with a different Physical Cell Identifier (PCI) than an assumed long-term evolution (LTE) carrier, wherein the first carrier is an anchor NB-IoT carrier, and wherein the NB-IoT anchor carrier:
operates inside the LTE carrier using the inband mode with same PCI as that of the LTE carrier, and
is refarmed to operate within the NR carrier.
2. The method according to claim 1, wherein the initiating sending is performed via one of: a) Master Information Block (MIB), b) Radio Resource Control (RRC) signaling sent on a NarrowBand Physical Broadcast Channel (NPBCH), and c) system information block (SIB).
3. The method according to claim 1, wherein the frequency channel raster grid is 100 kHz, and wherein the frequency offset is ±2.5 kHz or ±7.5 kHz.

4. The method according to claim 1, further comprising:
  initiating sending a third indication to the first wireless device, the third indication indicating that a second carrier is deployed in the guardband mode or in the inband mode, wherein the second carrier is a non-anchor NB-IoT carrier; and
  refraining from sending a fourth indication to the first wireless device, wherein the fourth indication is an information element comprising NB inband carrier information.

5. The method according to claim 1, further comprising:
  configuring the first carrier to operate within the NR carrier.

6. A first network node configured to operate in a wireless communications network using a Narrow Band-Internet of Things (NB-IoT), the first network node comprising a processor, wherein the processor is configured to:
  initiate sending a first indication to a first wireless device configured to operate in the wireless communications network using the NB-IoT, the first indication indicating that a first carrier is standalone (NB-IoT) carrier operating within a New Radio (NR) carrier, and the first carrier is:
  deployed in one of: a guardband mode and an inband mode, and
  shifted away by a frequency offset from a frequency channel raster grid configured to be used by the first wireless device; and
  initiating sending a second indication to the first wireless device, wherein the second indication is configured to indicate that the first carrier is operating with a different Physical Cell Identifier (PCI) than an assumed long-term evolution (LTE) carrier, wherein the first carrier is an anchor NB-IoT carrier, and wherein the NB-IoT anchor carrier:
  operates inside the LTE carrier using the inband mode with same PCI as that of the LTE carrier, and
  is refarmed to operate within the NR carrier.

7. The first network node according to claim 6, wherein the processor is further configured to initiate sending via one of: a) Master Information Block (MIB) b) Radio Resource Control (RRC) signaling sent on a NarrowBand Physical Broadcast Channel (NPBCH) and c) system information block (SIB).

8. The first network node according to claim 6, wherein the frequency channel raster grid is 100 kHz, and wherein the frequency offset is ±2.5 kHz or ±7.5 kHz.

9. The first network node according to claim 6, wherein the processor is further configured to:
  initiate sending a third indication to the first wireless device, wherein the third indication is configured to indicate that a second carrier is deployed in the guardband mode or in the inband mode, wherein the second carrier is a non-anchor NB-IoT carrier; and
  refrain from sending a fourth indication to the first wireless device, wherein the fourth indication is configured to be an information element comprising NB inband carrier information.

10. The first network node according to claim 6, wherein the processor is further configured to:
  configure the first carrier to operate within the NR carrier.

* * * * *